(12) United States Patent
Hirono

(10) Patent No.: US 6,263,343 B1
(45) Date of Patent: *Jul. 17, 2001

(54) SYSTEM FOR PROVIDING AND LINKING REGULARITY UPDATED MAP DATA WITH DATA RELATED TO THE MAP

(75) Inventor: Chiharu Hirono, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/778,571

(22) Filed: Jan. 3, 1997

(30) Foreign Application Priority Data

Jan. 11, 1996 (JP) .................................... 8-020435
Mar. 21, 1996 (JP) .................................... 8-091937

(51) Int. Cl.⁷ .................................... G06F 17/30
(52) U.S. Cl. .................... 707/104; 701/210; 701/207; 701/217; 341/83
(58) Field of Search ........................ 395/188.01; 345/356, 345/440, 27; 379/201; 701/200, 202, 1, 211, 25, 201, 210, 220, 217, 207; 705/27; 340/990, 995, 989; 342/64; 341/83; 707/104

(56) References Cited

U.S. PATENT DOCUMENTS

| | | | |
|---|---|---|---|
| 4,179,693 | * 12/1979 | Evans et al. | 342/64 |
| 4,675,676 | * 6/1987 | Takanabe et al. | 340/995 |
| 4,737,927 | * 4/1988 | Hanabusa et al. | 701/200 |
| 4,796,191 | * 1/1989 | Honey et al. | 701/217 |
| 4,843,569 | 6/1989 | Sawada et al. | 364/518 |
| 4,873,513 | * 10/1989 | Soults et al. | 345/27 |
| 4,954,958 | * 9/1990 | Savage et al. | 701/202 |
| 5,067,083 | * 11/1991 | Nakayama et al. | 701/220 |
| 5,473,324 | * 12/1995 | Ueno | 340/990 |

(List continued on next page.)

FOREIGN PATENT DOCUMENTS

| | | | |
|---|---|---|---|
| 0556400 | 8/1993 | (EP) | G06F/15/40 |
| 784296A | * 7/1997 | (EP) . | |
| 9305467 | 3/1993 | (WO) | G06F/3/00 |
| 9526532 | 10/1995 | (WO) | G06F/17/30 |

OTHER PUBLICATIONS

"MapQuest Launches Revolutionary GeoCentric Advertising Program Enabling Businesses to Provide Geographically Sensitive Advertisements as Users Click on Destinations and Content", PR Newswire, pp. 1104SFM033, Nov. 4, 1996.*

(List continued on next page.)

Primary Examiner—Thomas Black
Assistant Examiner—Charles L. Rones
(74) Attorney, Agent, or Firm—Jay H. Maioli

(57) ABSTRACT

A method and device for displaying map data and related data and thereby permitting easy enlargement of the scope of the application of map-based data services, wherein additional drawing data for superposing on a map displayed on a screen, and setting data for specifying a map display, are sent and received between different application programs using inter-application exchange in a standard data format. Required map data and related data are displayed on the screen using a first application program having a function for converting received additional drawing data and setting data to the aforesaid data format and transmitting it by inter-application exchange, then using a second application program which displays a map on the display screen according to the setting data transmitted by the first application program and displays additional data on the screen map corresponding to the additional drawing data.

9 Claims, 24 Drawing Sheets

U.S. PATENT DOCUMENTS

| | | | | |
|---|---|---|---|---|
| 5,519,619 | * | 5/1996 | Seda | 701/201 |
| 5,548,637 | * | 8/1996 | Heller et al. | 379/201 |
| 5,559,707 | * | 9/1996 | DeLorme et al. | 701/200 |
| 5,572,640 | * | 11/1996 | Schettler | 345/440 |
| 5,742,922 | * | 4/1998 | Kim | 701/201 |
| 5,745,865 | * | 4/1998 | Rostoker et al. | 701/25 |
| 5,774,824 | * | 6/1998 | Streit et al. | 701/207 |
| 5,774,828 | * | 6/1998 | Brunts et al. | 701/210 |
| 5,790,121 | * | 8/1998 | Sklar et al. | 345/356 |
| 5,790,785 | * | 8/1998 | Klug et al. | 395/188.01 |
| 5,794,164 | * | 8/1998 | Beckert et al. | 701/1 |
| 5,848,373 | * | 12/1998 | DeLorme et al. | 701/200 |
| 5,852,810 | * | 12/1998 | Sotiroff et al. | 705/27 |
| 5,875,412 | * | 2/1999 | Sulich et al. | 701/207 |
| 5,890,088 | * | 3/1999 | Nimura et al. | 701/211 |
| 5,917,433 | * | 6/1999 | Keillor et al. | 340/989 |
| 5,991,692 | * | 11/1999 | Spencer, II et al. | 701/217 |
| 5,999,865 | * | 12/1999 | Bloomquest et al. | 701/25 |
| 6,005,504 | * | 12/1999 | Hirono | 341/83 |

OTHER PUBLICATIONS

"Geosystems Delivers Java Applet for MapQuest", PR Newswire, pp. 226SFM014.*

"Product Sidewire: Geosystems Says that Users of MapQuest, an Online Mapping Service for the Internet", Telecomworldwire, Apr. 30, 1996.*

"Geosystems Delivers MapQuest: the Premier Interactive Mapping Service for the Internet", PR Newswire, pp. 0205SFM023, Feb. 5, 1996.*

"Internet Get Street Maps of the World", Newsbytes., Jul. 1996.*

"Moore Data Management Services Utilizes MapQuest Technology to Enhance CyberHomes Site, Increasing Competitive Advantage for Realtors", Newswire, pp. 1118SFM070, Nov. 1996.*

"Geosystems Delivers Java Applet for MapQuest", PR Newswire, pp. 226SFM014, Feb. 1996.*

Safreed, Sean J., "Mapping on the Infobahn", MacUser, v. 12, n. 6, p. 109(1), Jun. 1996.*

"Geosystems Outlines Strategy to Connect the Virtual World to the Real World", PR Newswire, pp. 0205SFM024, Feb. 1996.*

"MapQuest Unveils Enhanced Java and ActiveX Applets that Rival Today's CD-ROMs", PR Newswire, pp. 0930SFM053, Sep. 1996.*

"Mapquest Launches Revolutionary GeoCentric Advertising Program Enabling Businesses to Provide Geographically Sensitive Adverstisements as Users Click on Destinations and Content", PR Newswire, pp. 1104SFM033, Nov. 1996.*

"Map Designs Are Having a Big Impact on the Net", Internet Week, Sep. 1996.*

"Popularity of Web Mapping Helps Delorme", New Media Week, v. 2, n. 38, Sep. 1996.*

Scott, Susan, "Status and Direction of Map Database Standards Efforts in North America", IEEE Vehicle Navigation & Information Systems Conference, Ottawa—VNIS '93, p.21–24, 1993.*

Zavoli et al., "A System View of Digital Road Map Database in an IVHS with Emphasis on Subsystem Interface Requirements", IEEE Vehicle Navigation & Information Systems, p.600–607. 1992.*

Andresen et al., "Scalability Issues for High Performance Digital Libraries on the World Wide Web", IEEE Proceedings of ADL '96, p. 139–148, 1996.*

Seneff et al., "A New Restaurant Guide Conversational System: Issues in Rapid Prototypeing for Specialized Domains", IEEE Spoken Language, 1996. ICSLP 96. Proceedings., Fourth International Conference, vol. 2, p. 665–668, Oct. 1996.*

Trudeau, et al., Integrating AM/FM Maps with Distribution SCADA, Power Industry Computer Application Conference (IEEE Power Engineering Society), Seattle, WA (May 1–5, 1989), Conf. No. 16, Conf. Papers (May 1, 1989), pp. 135–140.

Parker, L., How the Nature Conservancy Uses a Biota Database to Protect Endangered Species (Abstract), Sci. Comput. Autom., pp. 51–53 (Apr. 1992).

Hiland, M.W. et al., Louisiana Coastal GIS Network: Graphical User Interface for Access to Spatial Data (Abstract), GIS/LIS '91 (Proceedings American Soc. Photogrammetry & Remote Sensing), vol. 2, pp. 845–856 (Oct. 28–31, 1991).

Mackaness, W.A., Curriculum Issues in GIS in k–12 (Abstract), Proceedings of Geographic Info. Sys. and Land Info. Sys. (American Soc. Photogrammetry 1 Remote Sensing, Oct. 25–27, 1994, pp. 560–569.

Kasahara, Yutaka, et al., Wing: A Geographical Information System for Supporting Regional Analysis and Facility Management (Abstract) NEC Research and Development, No. 73 (Apr. 1984), pp. 66–75.

*Louisiana Coastal GIS Network: Graphical User Interface For Access to Spatial Data*, Matterson W. Hiland et al., American Society of Photogrammetry and Remote Sensing, vol. 2, Oct. 28, 1991, pp. 845–856.

* cited by examiner

SHOP NAME
BUSINESS HOURS
TELEPHONE
DESCRIPTION

▲ ◀ ▶ ▼

F I G. 4A
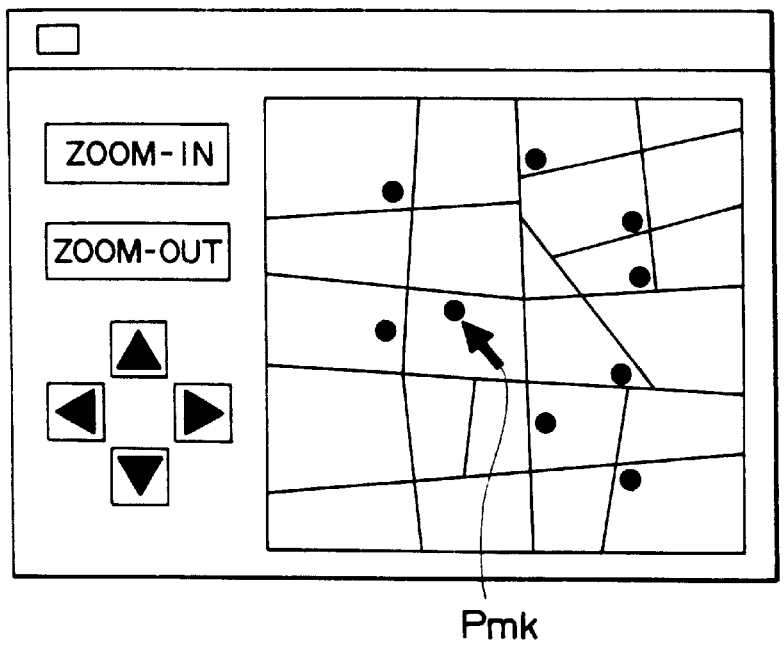
Pmk
F I G. 4B
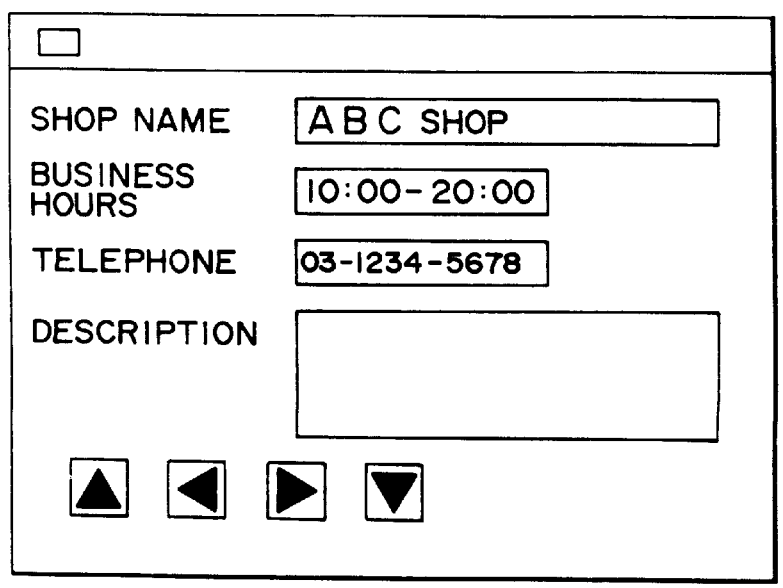

Ps CHARACTER STRING DRAWING START POINT

| MSB | | LSB | MSB | | LSB |
|---|---|---|---|---|---|
| 1ST BYTE | | | 2ND BYTE | | |
| 3RD BYTE | | | 4TH BYTE | | |
| | | | | | |
| 31ST BYTE | | | 32ND BYTE | | |

|  | MSB | | | | | | | LSB |
|---|---|---|---|---|---|---|---|---|
| 1ST BYTE | 0 | 0 | 0 | 1 | 0 | 0 | 0 | 1 |
| 2ND BYTE | 0 | 0 | 1 | 0 | 0 | 0 | 1 | 0 |
| 3RD BYTE | 0 | 1 | 0 | 0 | 0 | 1 | 0 | 0 |
| 4TH BYTE | 1 | 0 | 0 | 0 | 1 | 0 | 0 | 0 |
| 5TH BYTE | 0 | 0 | 0 | 1 | 0 | 0 | 0 | 1 |
| 6TH BYTE | 0 | 0 | 1 | 0 | 0 | 0 | 1 | 0 |
| 7TH BYTE | 0 | 1 | 0 | 0 | 0 | 1 | 0 | 0 |
| 8TH BYTE | 1 | 0 | 0 | 0 | 1 | 0 | 0 | 0 |

SYSTEM FOR PROVIDING AND LINKING REGULARITY UPDATED MAP DATA WITH DATA RELATED TO THE MAP

BACKGROUND OF THE INVENTION

1. Field of the Invention

This invention relates to an information retrieval system and information retrieval device which retrieve position data and related data, for example using the Internet, and display them.

2. Description of Related Art

The Internet comprises a service referred to as the WWW (World Wide Web), which performs multimedia data retrieval via the network based on hypertext linking character information, image information and audio information. An enormous amount of information of many kinds can be accessed using the WWW ranging from technical data and economic information to shopping and restaurant information. There are also many types of WWW sites ranging from official bodies such as Governments and local public authorities to small companies, shops and even individuals. It is moreover envisaged that services using the WWW will undergo even further expansion in the future.

When these WWW services are used, information about shopping and events can easily be obtained. However even if such information is acquired, map information is required to know exactly where a shop is located, or where an event is being held. When the WWW provides shopping or event information, it would be desirable if the location of a shop or event were displayed on a map. The WWW uses hypertext, so if a map of the nearby area is prepared as image data, and the location of the shop or event is marked on the map, the map can be marked at a predetermined position on a predetermined page.

However, roads and topography are extremely complex, and it is therefore very difficult for persons preparing Www pages to construct maps near shops or events, and paste them on predetermined pages. Also, the maps drawn by WWW page authors are frequently inaccurate.

A WWW site providing map data could be envisaged wherein, when position data such as latitude or longitude is input, a map corresponding to the specific position is displayed. If there were such a WWW site, a user who acquired shopping or event information could then open a WWW search page providing this map data, and find the location of a shop or event on a map by inputting its position.

To retrieve the map data, exact position information such as latitude and longitude are required. However, information regarding a shop or event generally includes only the shop name or event venue, telephone number and address, etc., and absolute position information such as latitude and longitude is almost never given. Therefore, even if map positions of shops or events are searched using a WWW site providing such map data, they are of no use if the absolute position of the shop or event is unknown.

CD-ROM's are on the market which contain map data, and a map display application which displays a map around a place when the place is specified, so it would seem feasible to use the map data in such a CD-ROM. Using the CD-ROM application, it is possible to retrieve the map data position for a shop or event.

This CD-ROM could also be used when preparing map data at sites which provide shopping or event information on the WWW. In other words, sites offering shopping or event information on the WWW would extract positions of shops or events from the map data in the CD-ROM. A shopping or event information page would be prepared, and map data from the CD-ROM would be pasted on the page. In this way, persons preparing WWW pages could paste accurate maps on pages without drawing maps themselves.

However, map data is constantly changing. New buildings are erected, old buildings are demolished, and cities are always in a state of flux. There is also regional development and new roadworks. Hence, if map data in a CD-ROM was used, it would be difficult to cope with these changes in the data. Also the maps used with the WWW would include all kinds, from full coverage maps of the whole world to detailed maps showing shops belonging to private individuals in various world areas and of various scales. CD-ROM's have a data storage limit, and cannot satisfy such wide-ranging demands.

Further, if WWW pages are prepared using the map data in a CD-ROM, the map data would be used without restriction and it would be difficult to protect copyrights.

SUMMARY OF THE INVENTION

It is therefore an object of the invention to provide a data structure group for offering map and/or related data, and a method for offering map and/or related data.

It is a further object of the invention to provide a data receiving apparatus.

According to this invention, there is provided position data such as for example latitude and longitude, and a map data base in which map data corresponding to this position data is stored. A position related data base in which this position data, and data related to position data such as data concerning buildings, shops and goods handled by the shops at the position in question, are stored, is also provided. This map data base, position related data base and a user terminal are connected by for example the Internet. On the user terminal, related data is searched using the position related data base, and a map of the corresponding location is displayed using the map data base. In this way, for example, shops meeting required conditions can be searched, and map data for the location can easily be obtained.

According to this invention, there is provided position data such as for example latitude and longitude, and a map data base in which map data corresponding this position data is stored. Also provided is a data base in which guide data is stored. When a map is required for this data, position data for this position is included. At the user terminal, the data is searched, and when there is a map in the supplementary data, this map data is sent from the map data base and included in the supplementary data. In this way, a map may be included in supplementary data such as guide data, and an accurate map may easily be displayed.

BRIEF DESCRIPTION OF THE DRAWINGS

FIG. 1-1 is a block diagram for the purpose of describing one embodiment of this invention.

FIGS. 4A and 4B are typical displays for the purpose of describing an embodiment of this invention.

DETAILED DESCRIPTION OF THE PREFERRED EMBODIMENTS

Figure 1:
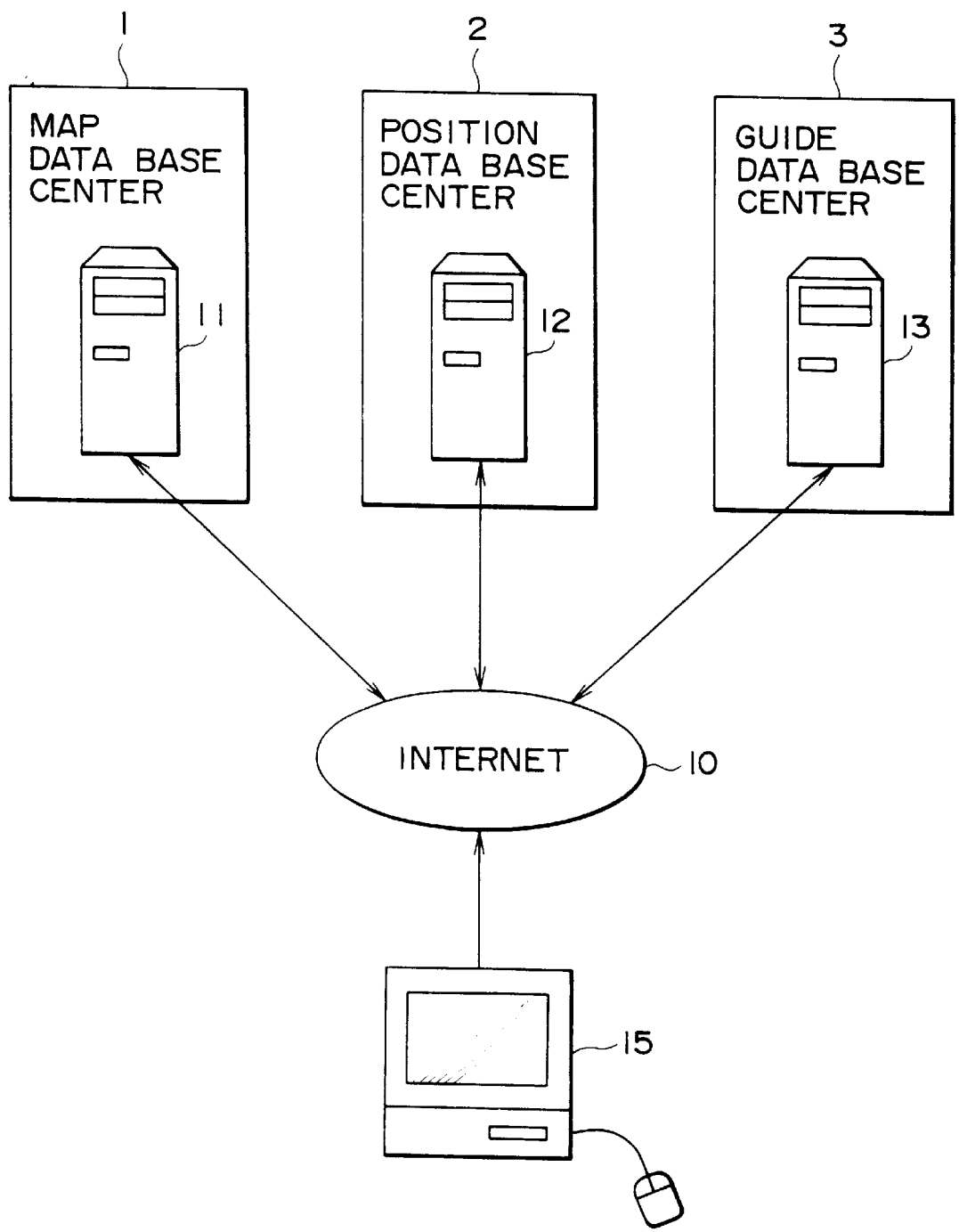
FIG. 1 is a block diagram for the purpose of describing an embodiment of this invention.
Figure 1:
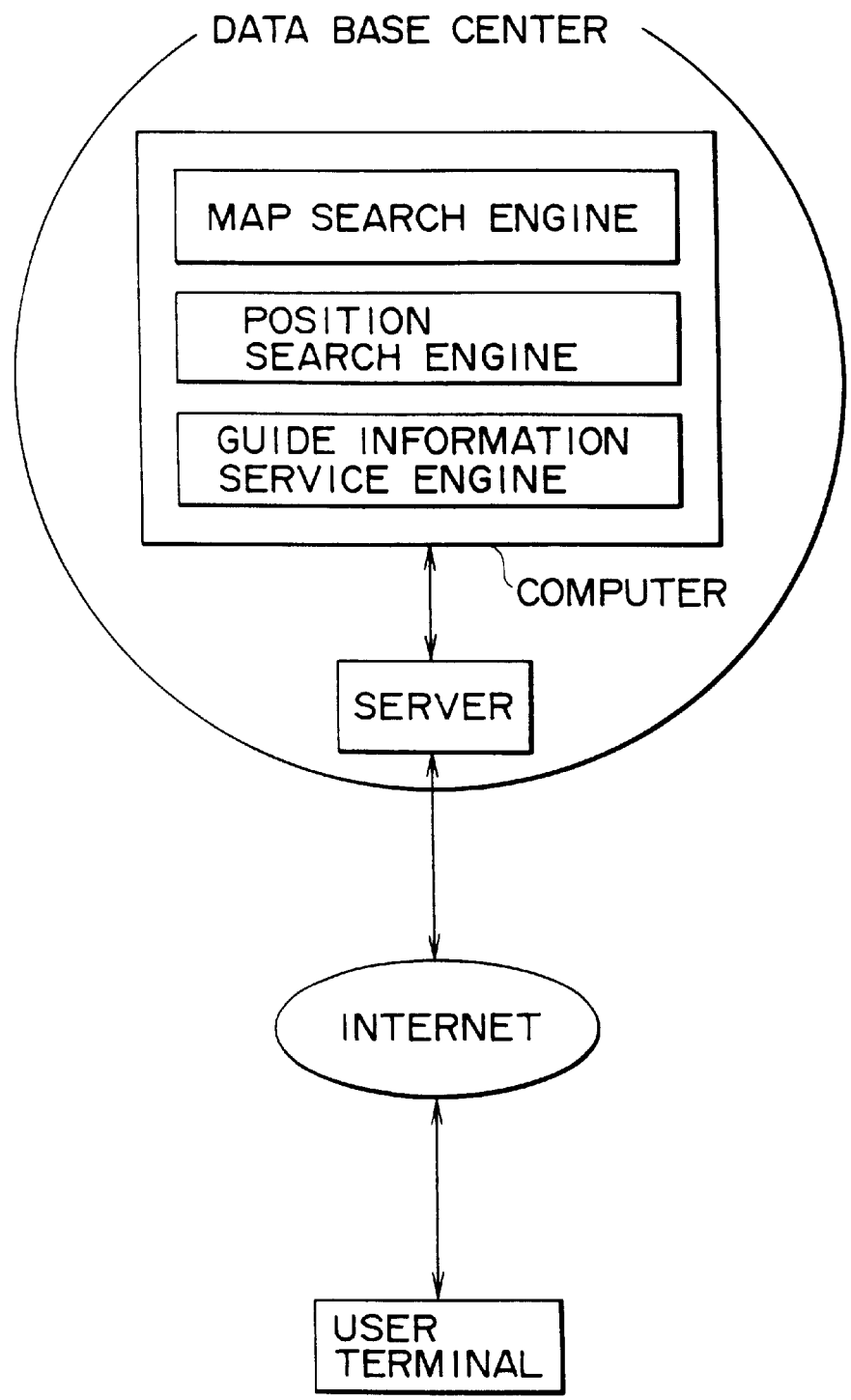

This invention will be described in the following sequence.
1. System overview
2. Processing by position retrieval service
3. Processing by guide information service with added map data
4. Protection of data in map data base
5. Modifications
6. Map drawing information 1. System Overview FIG. 1 shows an outline of a system to which this invention is applied. In FIG. 1, 1 is a map data base center. The map data base center 1 manages a WWW site providing map data. The WWW is a service which performs multimedia data retrieval via a network based on hypertext linking character information, image information and audio information. To use the WWW, an application program referred to as a browser is used. In the WWW, using hypertext, links to other WWW sites, Gopher servers and FTP servers can easily be made.

The meaning of WWW in the context of this invention is used in the wide sense of a general entity comprising all data structures, such as http/gopher/ftp.

The map data base center 1 is provided with a server 11 connected to the Internet 10. The server 11 stores map data corresponding to position data such as latitude and longitude. In other words, 0th dimension information. The map data stored in the server 11 is constantly updated to correspond with constantly changing map data. Desired map data may be obtained by accessing the WWW site of the map data in this map data base center 1.

Figure 2A:
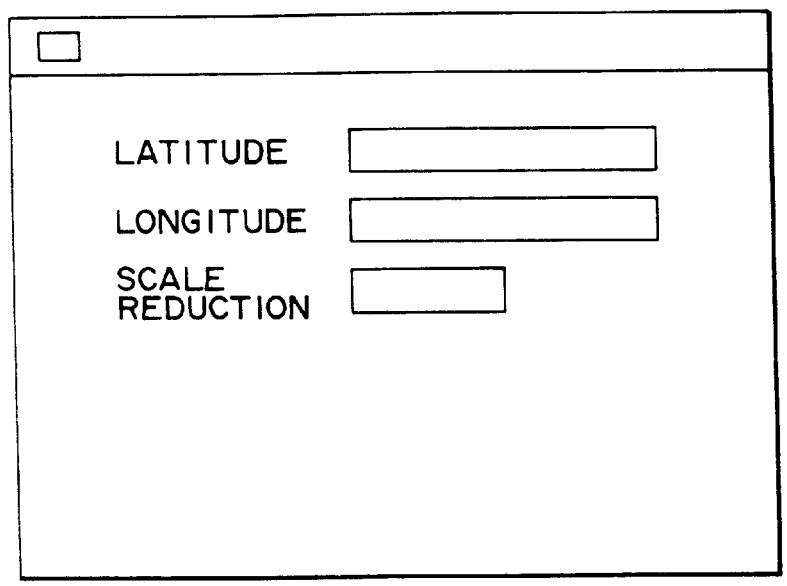
FIGS. 2A and 2B are typical displays for the purpose of describing an embodiment of this invention.
Figure 2B:
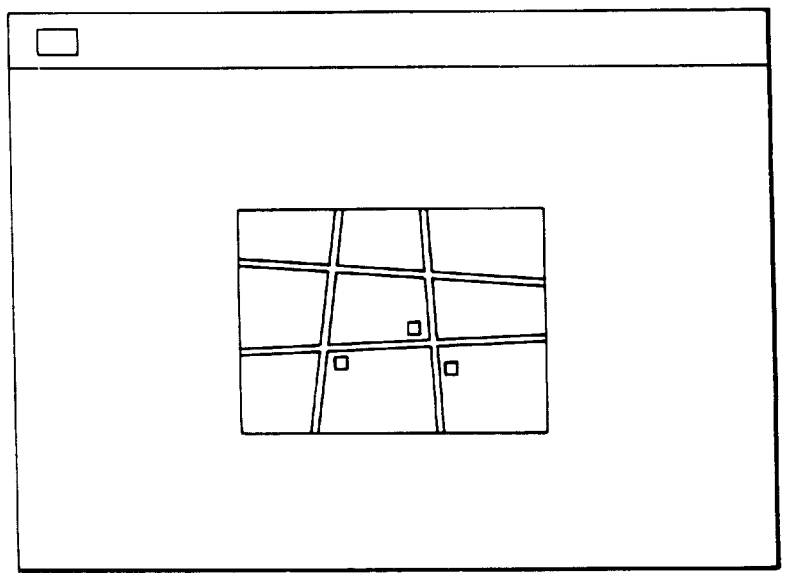

For example, assume that a user who has a user terminal 15 which can be connected to the Internet 10, wishes to acquire map data. For this purpose, he opens the WWW site managed by the map data base center 1. When the map data base site is opened, a map data search page is sent to the user terminal 15 from the server 11 of the map data base center 1, as shown in FIG. 2A. The user enters parameters of the desired map data, e.g. latitude, longitude and scale reduction, in this search page. When the parameters are input, the desired map data is searched from the map data stored in the server 11. This map data is sent to the user terminal 15 from the server 11 of the map data base center 1, and the desired map is displayed on the screen of the user terminal 15 as shown in FIG. 2B.

The amount of data required for map display is enormous. Consequently when map data is sent from the server 11 of the map data base center 1, and all the data required for the map display is sent, transfer time is long and the network load is high. Therefore, drawing information comprising numbers and character strings for drawing a shape on the map is sent as described hereafter.

Numeral 2 in FIG. 1 is a position data base center. The position data base center 2 manages a WWW site for searching the position of a shop or event venue. The position data base 2 has a server 12. This server 12 stores a data base for searching, for example, latitude/longitude data corresponding to addresses, main building names and shop names, and latitude/longitude data for event venues. The data in the server 12 of the center 2 also comprises information such as shop opening hours, types of business conducted and goods handled. When the WWW site of the center 2 is accessed, and for example addresses are input, latitude/longitude data can be retrieved. Again, when main building names, shop names and event venues are input, latitude/longitude data can be retrieved. Conversely, when latitude/longitude data is input, addresses, main building names or shop names can be searched. Moreover, shops, etc., which meet given conditions such as types of business or opening hours, can be retrieved.

Searches wherein maps are directly displayed may also be performed by linking the WWW site of the position data base center 2 and the WWW site of the map data base center 1.

Figures 3A, 3B:
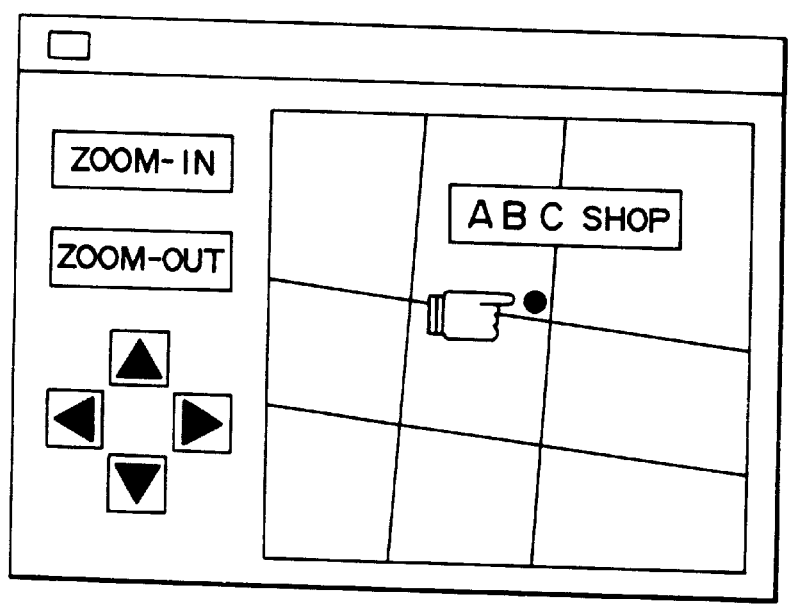
FIGS. 3A and 3B are typical displays for the purpose of describing an embodiment of this invention.

For example, assume the user wishes to know the location of a shop which meets predetermined conditions. In this case, the user opens the WWW site managed by the position data base center 2 using the browser of the terminal 15. When the site of the center 2 is opened, data is sent from the site of the center 2 to the terminal 15, and the position search WWW page is displayed on the screen of the terminal 15, as shown in FIG. 3A. The user enters the required items on the search page. When the required items are entered, latitude/longitude data for the positions of shops which meet the conditions is searched based on the items entered by the server 12 of the center 2. Retrieved latitude/longitude data is sent to the map data base center 1. When latitude/longitude data is sent to the center 1, map data corresponding to this position is searched from map data stored in the server 11. This map data is linked to the position search WWW page, and a map of the input shop is thereby displayed on the screen of the terminal 15 as shown in FIG. 3B.

Conversely, assume that the user wishes to know the address or telephone number of a location shown on the map. In this case, the WWW site managed by the position data base center 2 and the WWW site of the map data base center 1 are linked, and the screen shown in FIG. 4A is displayed on the terminal 15. Herein, when a point Pmk on the map is specified, the position of this point (latitude/longitude) is sent from the server 11 of the center 1 to the server 12 of the center 2. Information concerning the place corresponding to this position is then searched by the server 12 of the center 2, and is displayed as shown in FIG. 4B.

Numeral 3 is a guide data base center. This center 3 manages a WWW site which provides guide data. The center 3 has a server 13 connected to the Internet 10. The server 13 stores information about events and shopping, etc.

When the user wishes to acquire information about events or shopping, he opens a WWW site managed by the center 3 using a browser in the terminal 15. When the site of the center 3 is opened, data is sent from the server 13 of the center 3 to the terminal 15, and the guide data WWW page is displayed on the screen of the terminal 15. Using this guide data WWW page, event or shopping data can be obtained.

It is sometimes desired to display shops and event venues on a map in the guide data WWW page. Conventionally, when map data was displayed, the map data was prepared by the center 3, and this had to be pasted on the WWW page. In the system to which this invention,is applied, however, this is unnecessary because map data stored in the server 11 of the center 1 can be used as the map data displayed in the guide data.

Figure 5:
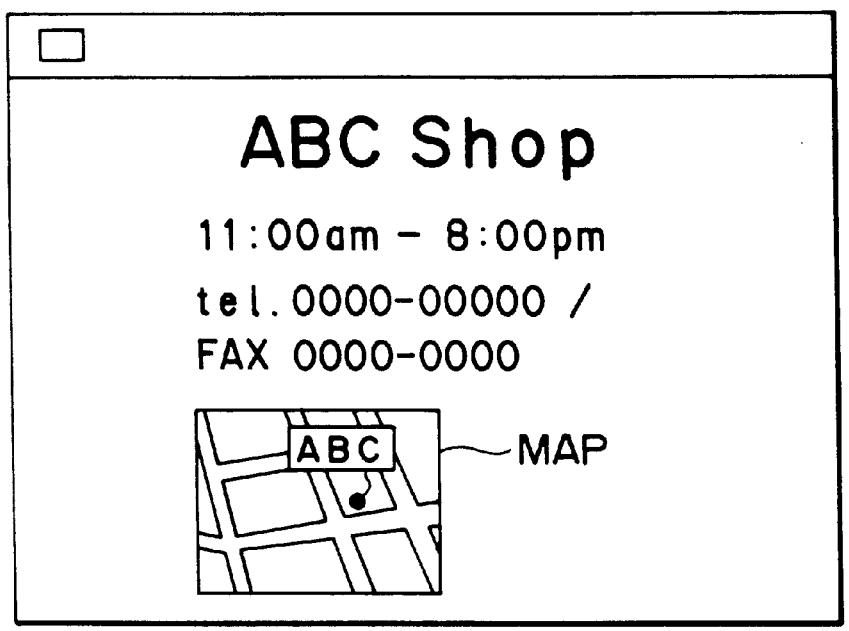
FIG. 5 is a rough drawing for the purpose of describing an embodiment of this invention.

Specifically, a map is displayed in a part indicated by MAP in the guide data WWW page shown in FIG. 5. The map MAP is map data extracted from the server 11 of the center 1. In other words, the guide data read from the server 13 of the center 3 and map data read from the server 11 of the center 1 are combined, and the guide data page comprising the map MAP is displayed as shown in FIG. 5.

Figure 6A:
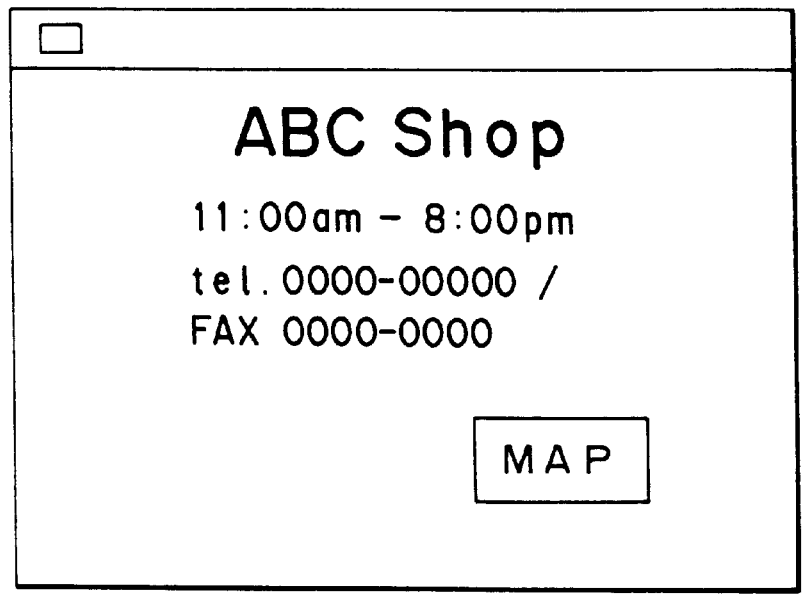
FIGS. 6A and 6B are typical displays for the purpose of describing an embodiment of this invention.
Figure 6B:
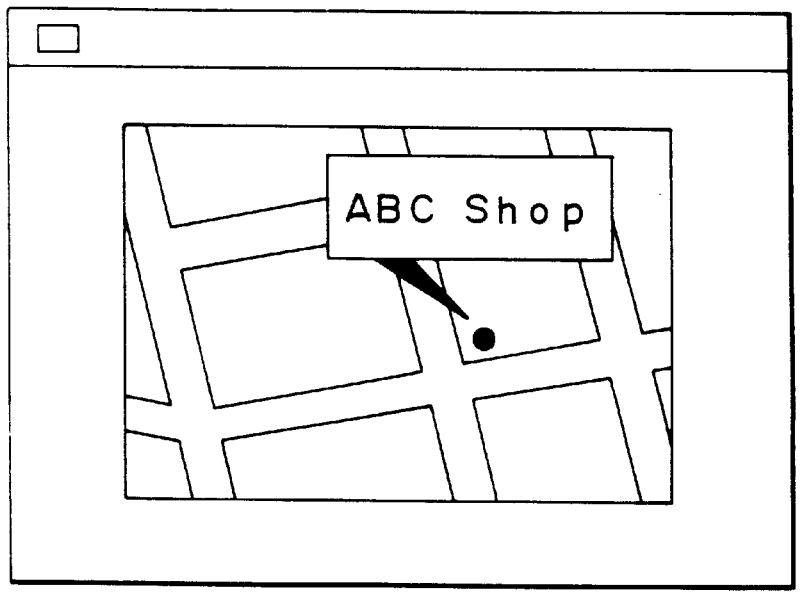

It should be understood that when maps from the center 1 are combined in the guide data WWW page, maps in the WWW page may be combined using the browser of the terminal 15. Map data may also be prepared and supplementary data superposed by the map data base center 1. In other words, when the guide data base center 3 is opened by the browser of the terminal 15, a guide data search page is sent as shown in FIG. 6A. When a MAP button in this page is pressed, corresponding map data is retrieved by the center 1, and combined by the center 2. This map is then displayed on the screen of the terminal 15 as shown in FIG. 6B.

Hence, systems to which this invention is applied comprise a data base center 1 which provides map data via the WWW. When this center 1 which provides map data is accessed, map data comprising a position is extracted from position data such as latitude or longitude. In addition the center 1, by linking up to the center 2 or the WWW page of the center 3, provides a service whereby a position of a shop or event is searched from the shop or event name so as to display it on a map, and the map data is simply embedded in the guide data.

2. Processing by Position Search Service

A description will now be given of the processing performed when the WWW of the center 1 and the WWW of the center 2 are linked, a position is searched from the name of a shop or event and displayed on a map, and information about the shop at that location is displayed from the map position.

Figure 7:
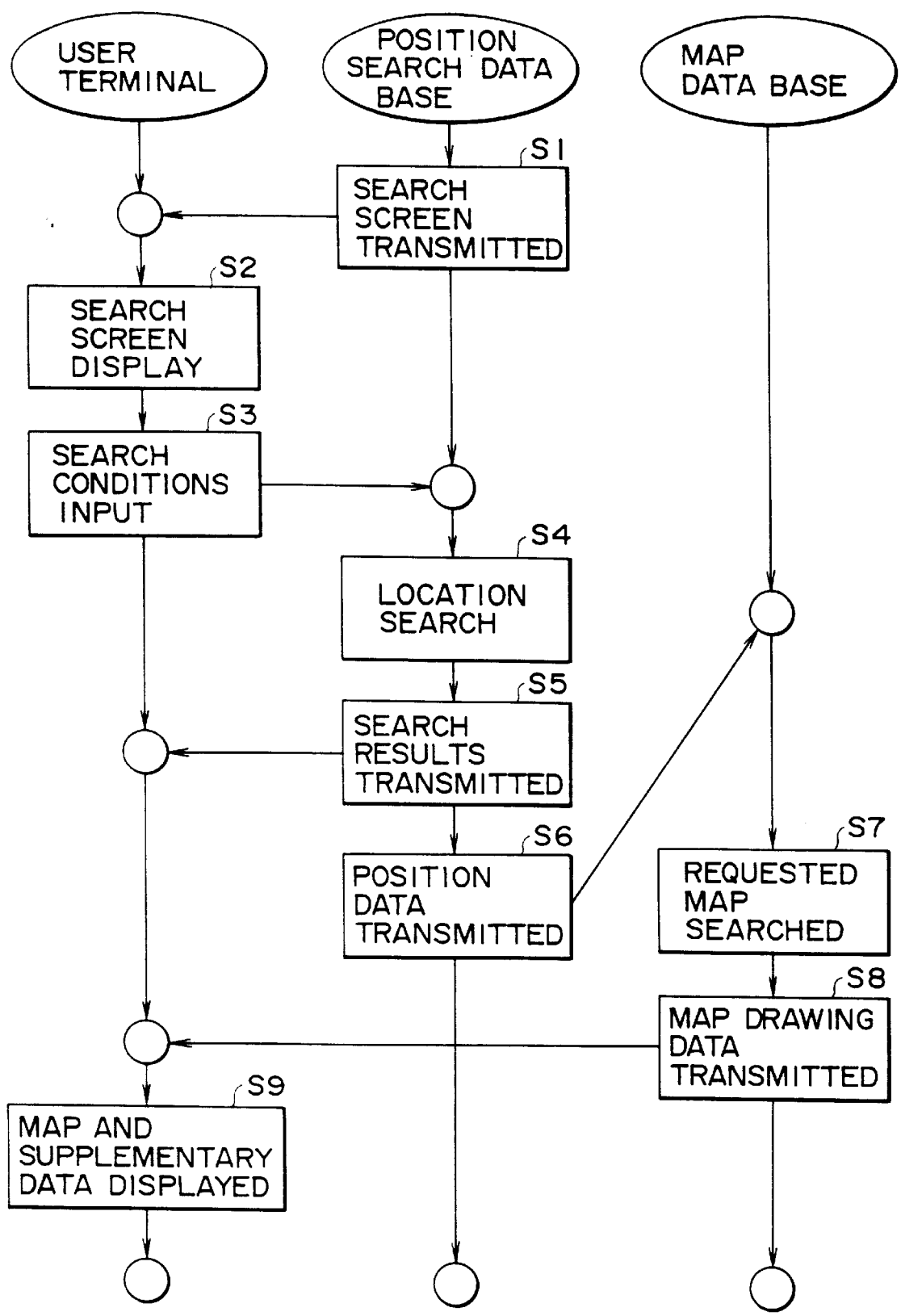
FIG. 7 is a state transition diagram for the purpose of describing the image display according to one embodiment of this invention.

FIG. 7 is a flow chart showing the processing performed at this time. A search page is sent to the user terminal 15 from the server 12 of the position search data base center 2 (step S1). This search page is displayed on the screen of the user terminal 15 (step S2). A search condition is input from the keyboard or mouse, and sent from the user terminal 15 to the server 12 of the center 2 (step S3). Places conforming to this condition are searched by the server 12 of the center 2 (step S4), and the search result is sent to the user terminal 15 (step S5). Also, position data (latitude, longitude) for the searched location is sent to the server 11 of the map data base 1 from the server 12 of the center 2 (step S6). Map data corresponding to this position data is searched by the server 11 of the map data base 1 (step S7). A drawing command for this map data is then sent to the user terminal 15 from the server 11 of the map data base 1 (step S8).

The search result from the center 2 and the map data from the center 1 are sent to the user terminal 15. The search data and map data sent to the user terminal are then linked by a browser, and displayed on the screen (step S9).

Figure 8:
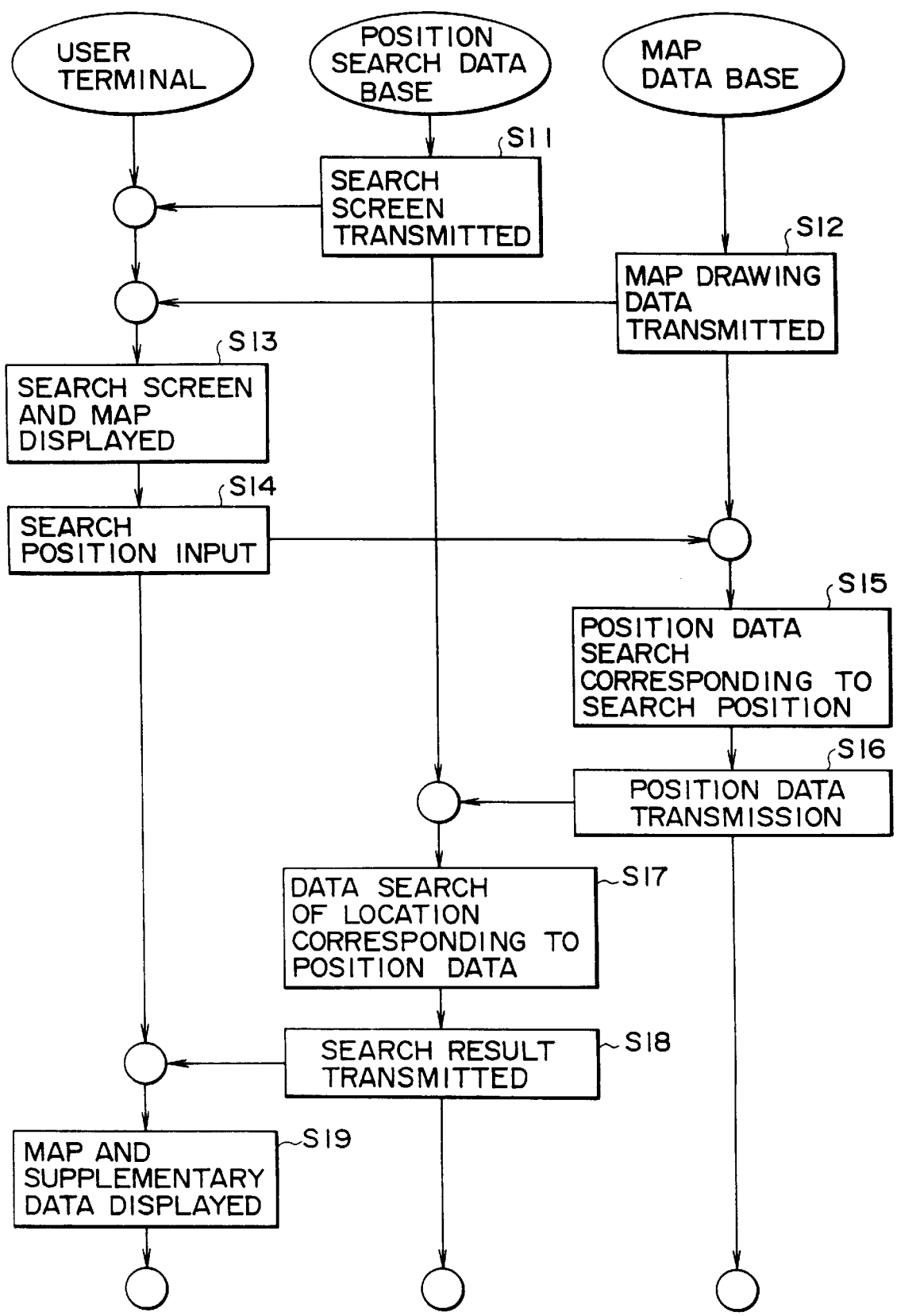
FIG. 8 is a state transition diagram for the purpose of describing the image display according to one embodiment of this invention.

FIG. 8 is a flowchart showing the processing performed when a map is displayed on the search screen, a position on the map is entered, and data corresponding to this position is searched.

The search screen from the server 12 of the data base 2 is sent to the user terminal 15 (step S11), the map drawing data from the server 11 of the map data base center 1 is sent to the user terminal 15 (step S12), the search screen and map drawing data are linked by the application software of the browser, and a search screen and map are displayed on the screen (step S13). When a search position is specified on this map, the search position is sent to the server 11 of the center 1 (step S14). Position data corresponding to the search position on the map is searched by the server 11 of the center 1 (step S15). This position data is then sent to the server 12 of the position search data base 2 (step S16). Data for a location corresponding to this position information is searched by the server 12 of the data base 2 (step S17). The data for the searched location is sent to the terminal 15 from the server 12 of the center 2 (step S18).

The map data and data for the searched location are then linked by the browser, and displayed on the screen (step S19).

3. Processing of Guide Data Added to Map Data

Figure 9:
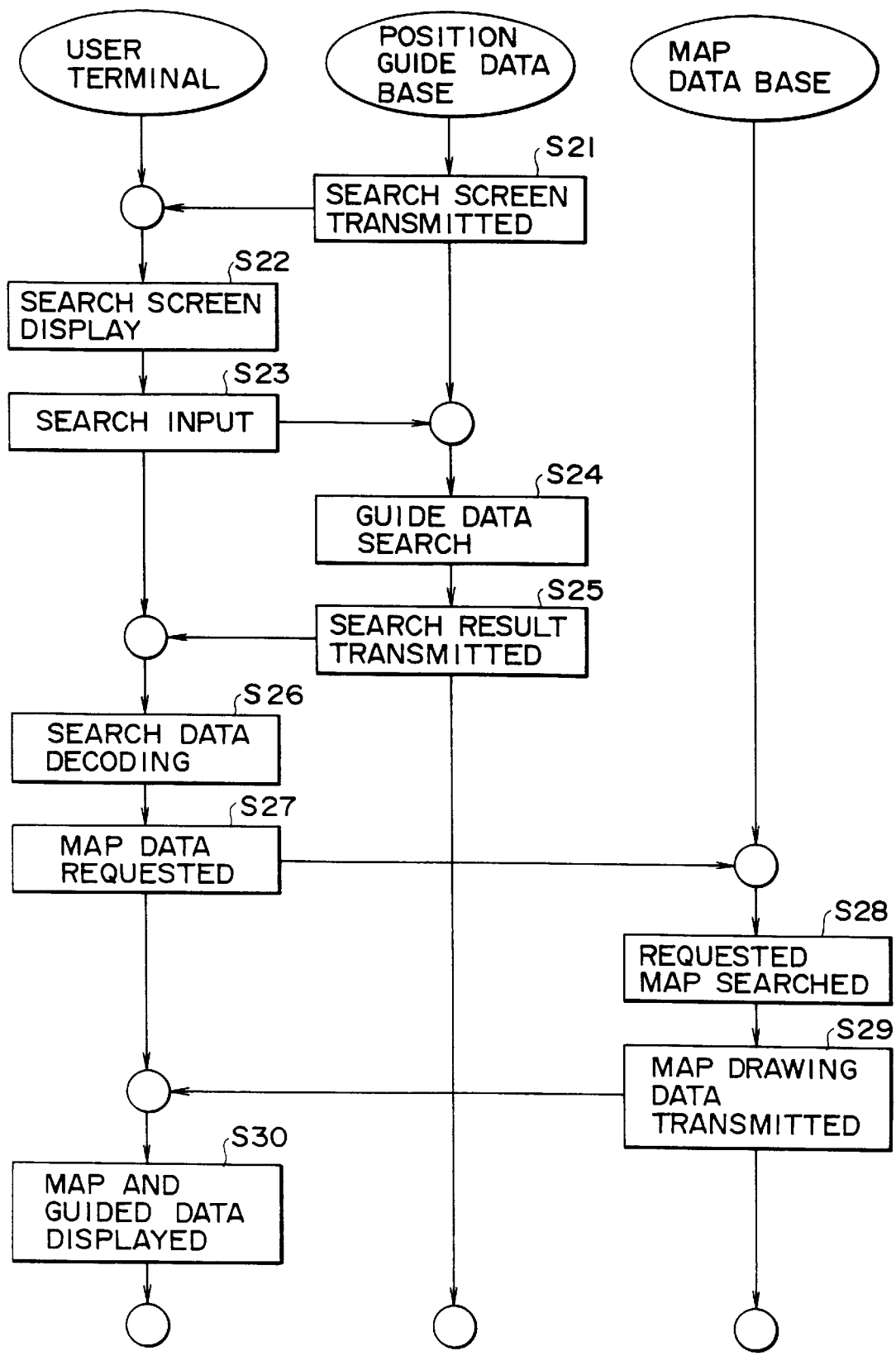
FIG. 9 is a state transition diagram for the purpose of describing the image display according to one embodiment of this invention.

FIG. 9 is a flowchart showing an example of the processing performed when map data is embedded in guide information. In FIG. 9, a search screen is sent to the user terminal 15 from the server 13 of the center 3 (step S21). This search screen is displayed on the screen of the user terminal 15 (step S22). When search data is input to the user terminal 15 via a user keyboard or mouse, this search data is sent to the center 3 (step S23).

Guide data corresponding to the search data is searched by the server 13 of the center 3 (step S24). This guide data is sent from the server 13 of the center 3 to the user terminal 15 (step S25). In the user terminal 15, the guide data is decoded (step S26). A command for displaying a map using the map data base and map position data (specifically, latitude and longitude, etc.) is embedded in this guide information. Map data is requested from the center 1 according to this command and map position data (step S27).

The server 11 of the map data base 1 searches the desired map according to the map position data received (step S28). Drawing data for this map is then sent from the server 11 of the center 1 to the user terminal 15 (step S29).

Hence, guide data from the center 3 and map drawing data from the center 1 are sent to the user terminal 15. The search data in the guide data sent to the user terminal 15 and map drawing data from the center 1 are linked by a browser, and displayed on the screen (step S30).

Figure 10:
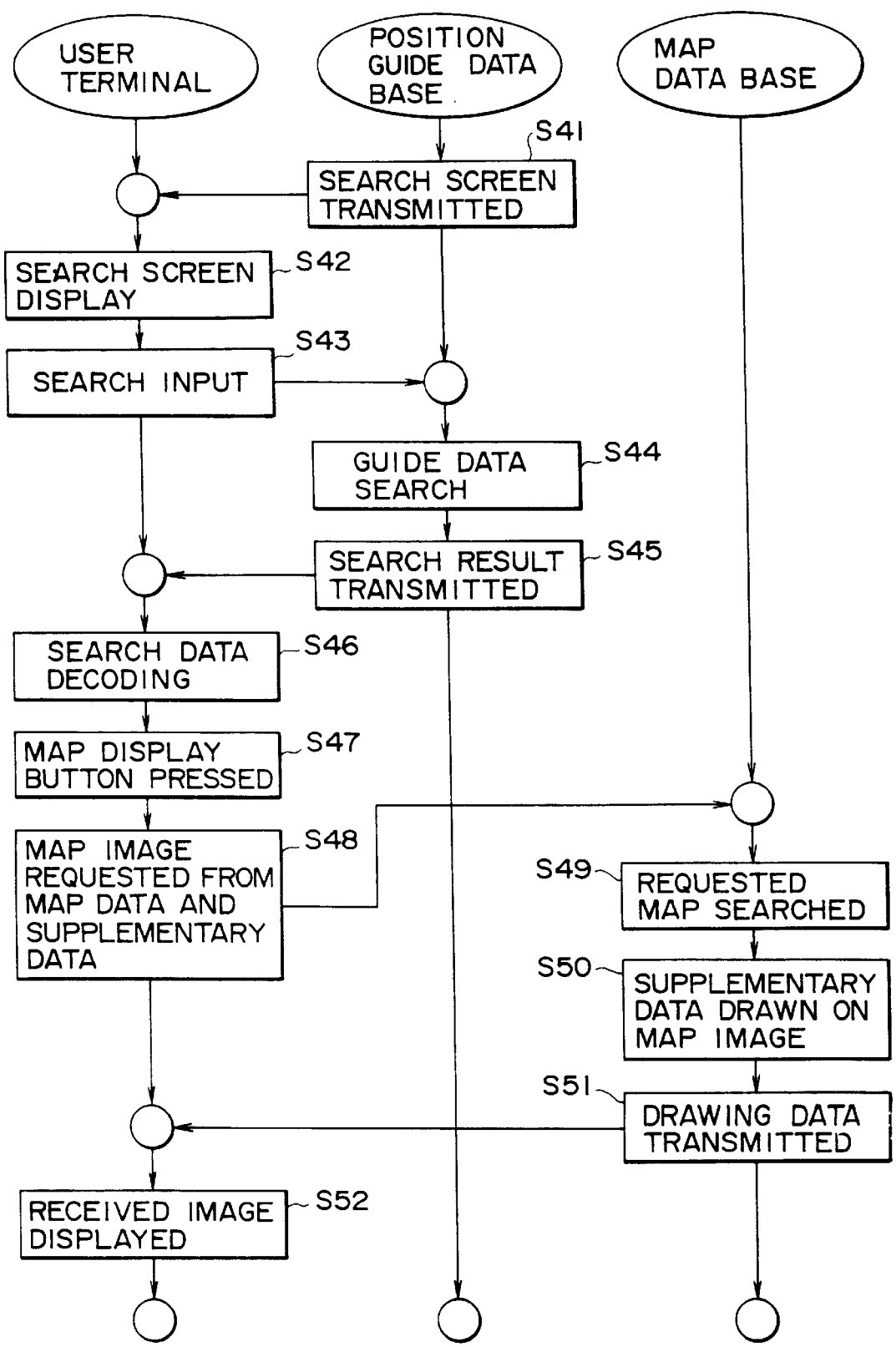
FIG. 10 is a state transition diagram for the purpose of describing the image display according to one embodiment of this invention.

FIG. 10 shows another example of processing where map data from the map data base center 1 is added to a page of the center 3. According to this example, map data was prepared and supplementary data superposed in the center 3. In FIG. 10, a search screen is sent from the server 13 of the center 3 to the user terminal 15 (step S41). This search screen is displayed on the screen of the user terminal 15 (step S42).

When search data is input by the user terminal 15 via a user keyboard or mouse, this search data is sent to the center 3 (step S43). Guide data corresponding to the search data is searched by the server 13 of the center 3 (step S44). The searched guide data is sent to the user terminal 15 from the server 13 of the center 3 (step S45). In the user terminal 15, the searched guide data is decoded (step S46). This guide data comprises a button to display map data.

When this button is pressed (step S47), a map image display request is sent from the user terminal to the server 11 of the center 1 (step S48). The server 11 of the center 1 searches the requested map according to received map position data (step S49). Supplementary data is drawn on the map image (step S50). Hence, supplementary data is superposed, and drawing data is sent from the server 11 of the map data base 1 to the user terminal 15 (step S51). The received image is displayed by the user terminal 15 (step S52).

According to this example, map data and supplementary data are combined in the center 1, and then sent to the user terminal 15, so there is no need for the browser to have a special command to link the map data.

4. Data Protection for Map Data Base

By providing a map data base center 1 as described, a WWW page with map data can easily be made even when map data is not prepared by the guide data base center 3. However, there is a risk that if map data can be easily accessed, it might be impossible to protect copyrights of maps prepared by the map data base center 1.

Figure 11:
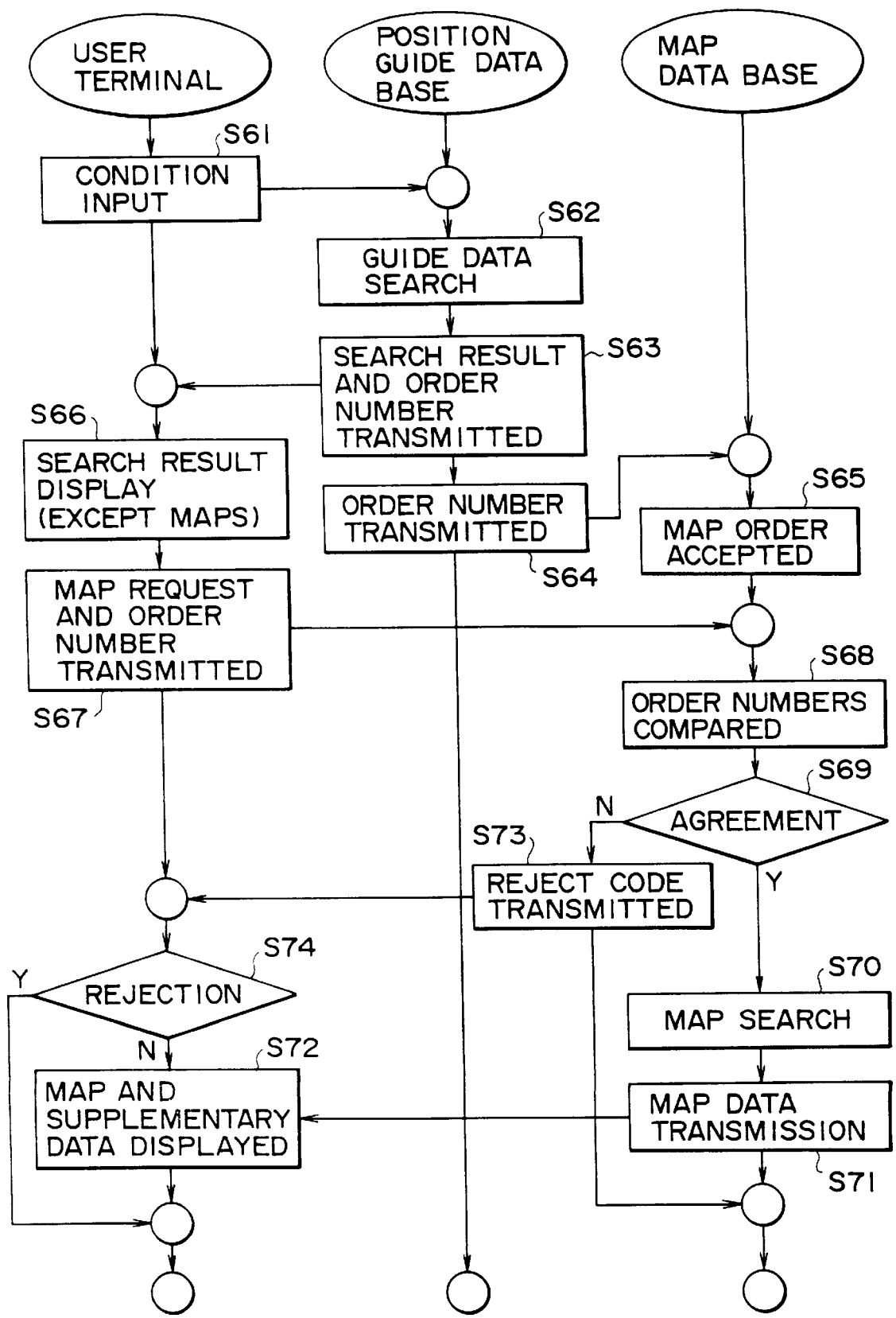
FIG. 11 is a state transition diagram for the purpose of describing the image display according to one embodiment of this invention.

This problem might be resolved by the processing shown in FIG. 11.

In FIG. 11, when search data is input at user terminal 15 and transmitted to the center 3 from the user terminal 15 (step S61), a search is conducted by the server 13 of the center 3 (step S62). An order number is transmitted to the user terminal 15 from the server 13 of the center 3 (step S63). A similar order number is then sent to the server 11 of the center 1 from the server 13 of the center 3 (step S64), and this order number is accepted by the center 1 (step S65).

This order number comprises a code A issued by the center 1, and an order serial number generated by the center 3, and the two codes are also encoded. The code A is updated by the center 1 at regular intervals (e.g. every hour), and is sent to a data base center which has a contract with the center 1. After this code is issued, order numbers containing codes other than the code A are not accepted.

The user terminal 15 displays the search result sent from the center 3 (step S66), and a map request corresponding to search data and the order number from the center 3 are sent to the center 1 (step S67).

In the map data base center 1, order numbers are accepted via two routes, i.e. from the center 3 and the user terminal 15. In the map data base center 1, the order number from the center 3 and the order number from the terminal 15 are compared (step S68). As the same order number is sent to the user terminal 15 and the center 1 from the center 3, the order numbers should be identical in the case of legitimate use. It is determined whether or not the order numbers coincide (step S69), and when it is determined that they are identical, map data is searched (step S70), and this map data is sent to the user terminal 15 (step S71). This map data and supplementary data are displayed on the user terminal 15 (step S72). When the order numbers do not coincide, a reject code is sent to the user terminal 15 from the server 11 of the center 1 (step S73). It is determined whether or not this reject code was accepted (step S74), and if the reject code was accepted, display of map data is refused (step S74).

5. Modification

In the above examples, the data base center has been described as being connected to the INTERNET, however data base centers may be connected in other ways. This is shown in FIG. 1-1. In FIG. 1-1, a user terminal is connected to a data base server via the INTERNET, and the server is connected to a computer in a data base center. The computer has a map search engine, position search engine and guide information service engine which are firmware, and they each have their respective functions. In this case, the only hardware is the computer, each engine exists only as software, and it is unnecessary to clearly specify the positions of all the commands in the program for each engine. Therefore, the same effect as that of FIG. 1 may be obtained if objects that start each engine function according to the state transition diagrams in FIG. 7–FIG. 11 even when each engine is not distinguished physically or in the program arrangement.

It will be understood that the intermediate states of FIG. 1 and FIG. 1-1, i.e. the map search engine and position search engine, may be located in the same computer, and only the guide information service engine being located in another data base center.

It will further be understood that apart from the INTERNET, this invention may be applied also to general computer communications services and leased circuit connections.

6. Map Drawing Data

As described hereinabove, map drawing data is sent to increase transfer rates and reduce the load on the network when map data is sent from the map data base center 1. This drawing data will now be described in more detail.

A. (Latitude/Longitude Format)

Latitude and longitude are expressed as follows:

Latitude: 4 byte integer with code

Longitude: 4 byte integer with code

Northern latitude and eastern longitude are expressed as positive, southern latitude and western longitude are expressed as negative.

When the angle is expressed in 1/2000 second units, the maximum value=+180×60×60×2000=4D3F6400hex, the minimum value=−+180×60×60×2000= B2C09C00hex, and maximum value−minimum value=360×60×60×2000= 9A7EC800hex.

This value is used effectively up to the uppermost bit of the 4 bytes. The number of bytes is a square, and as they are the same as the integer processing units of a computer, it is suited for use with a computer.

Making the above value correspond with the circumference of the equator (6378167 m), we obtain:

$$2\pi \times 6378167/360 \times 60 \times 60 \times 2000 = 0.01546 \text{ (m)}.$$

At this resolution, when the map is displayed on the screen of a personal computer having 640 dots×480 dots (1 dot=1 pel), the length of the display in the horizontal direction is:

$$640 \times 0.01546 = 9.8944 \text{ (m)}$$

which is adequate for displaying the form of buildings, etc.

To represent latitude and longitude, coded numbers and character strings may be used with other methods, and error correction codes may also be applied in the coding.

B. Communication Commands

There are the following 4 types of commands:
(1) Environment setting group
(2) Drawing command group
(3) Property specifying group
(4) Point indicating group Most drawing commands have a property number specifying argument. Commands are either pure commands or commands associated with an argument. The commands in each group are described below.

Figure 12:
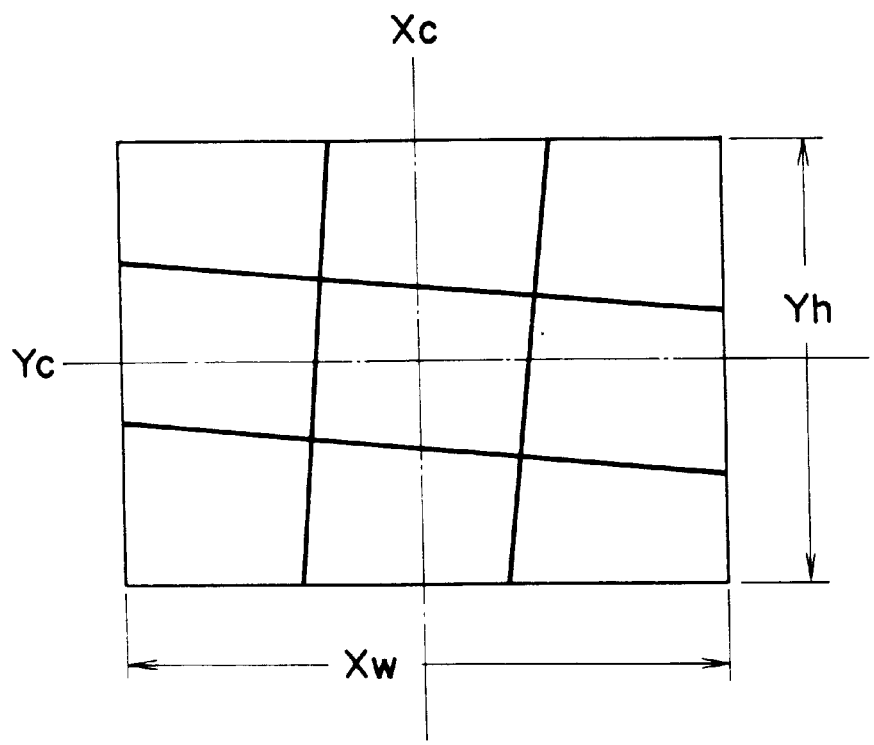
FIG. 12 is a rough drawing for the purpose of describing drawing data according to an embodiment of this invention.

(1) Environment Setting Group a. Scale reduction
(Argument)
  Scale reduction: 4 byte integer with code
  Shows the actual distance on the earth per 100 dots in a horizontal direction on the map display as a longitude interval.
  The format is the same as that of latitude/longitude.
(Function)
  When the map display application has the scale reduction data which was actually specified, it follows this data.
  When it does not have this data, it either displays data having an approximate scale reduction close to this value or converts this approximate data to data having the specified scale reduction.

b. Display center position
(Argument)
  Latitude: 4 byte integer with code
  Longitude: 4 byte integer with code
  Displays the position of the map center.
(Function)
  As shown in FIG. 12, the map display application prepares and displays map data such that the display center position Xc, Yc is in the center in the directions of latitude and longitude.

c. Display frame size
(Argument)
  Horizontal direction size: 2 byte integer without code
  Vertical direction size: 2 byte integer without code
  The display frame size Xw, Yh (FIG. 12) is expressed as a number of dots.
(Function)
  When the map display application displays a map in a window of another application, it shows the size of the display area (FIG. 12).

Figure 13:
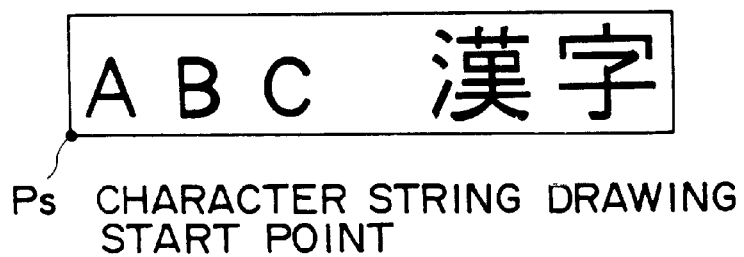
FIG. 13 is a rough drawing for the purpose of describing drawing data according to an embodiment of this invention.
Figures 14, 15:
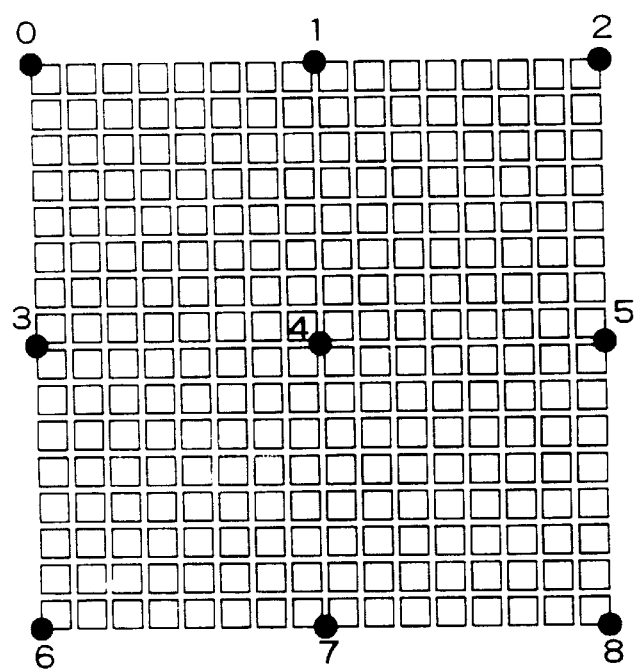
FIG. 14 is a rough drawing for the purpose of describing drawing data according to an embodiment of this invention.
FIG. 15 is a rough drawing for the purpose of describing drawing data according to an embodiment of this invention.
Figure 16:
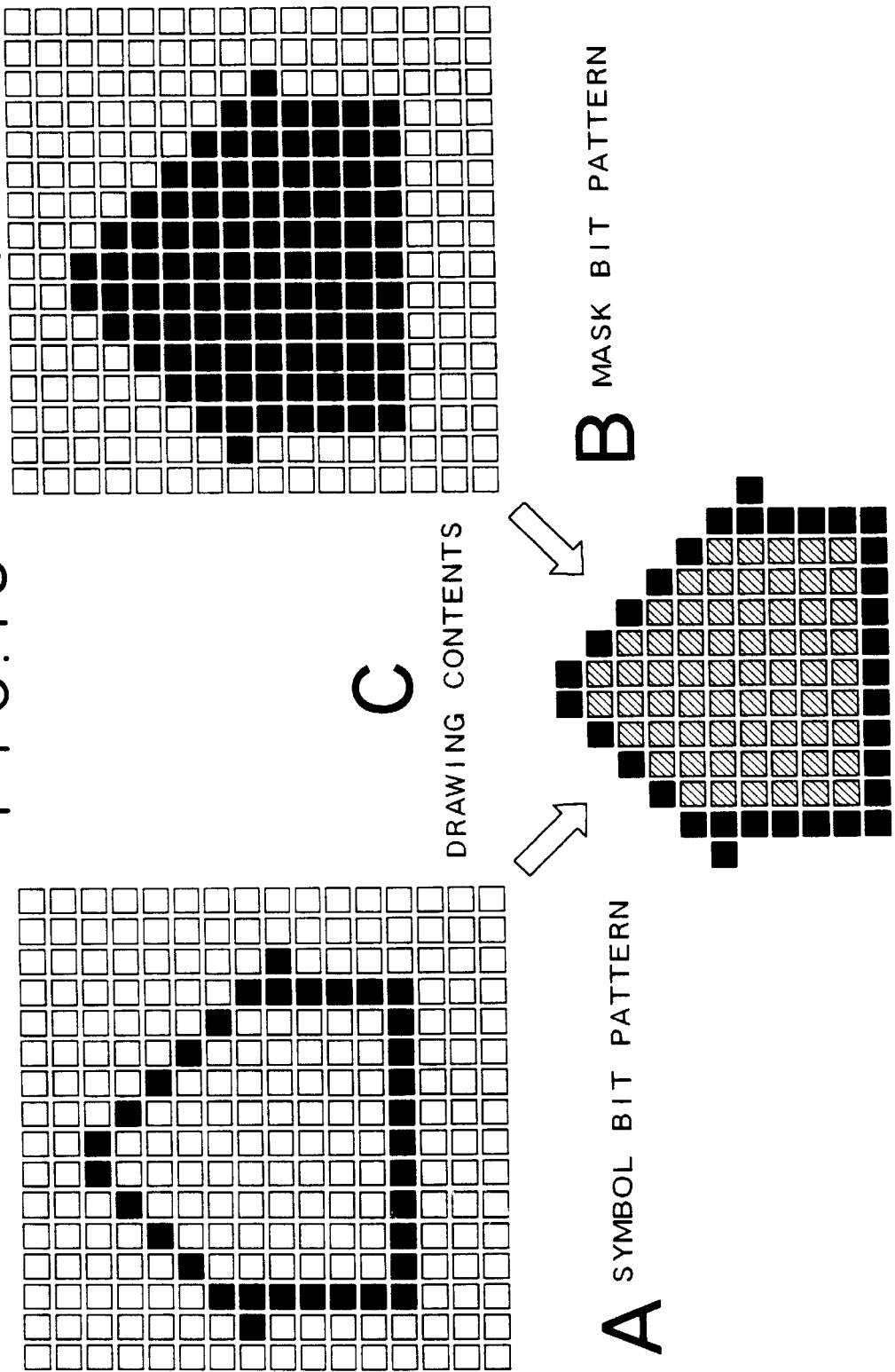
FIG. 16 is a rough drawing for the purpose of describing drawing data according to an embodiment of this invention.
Figures 17, 18:
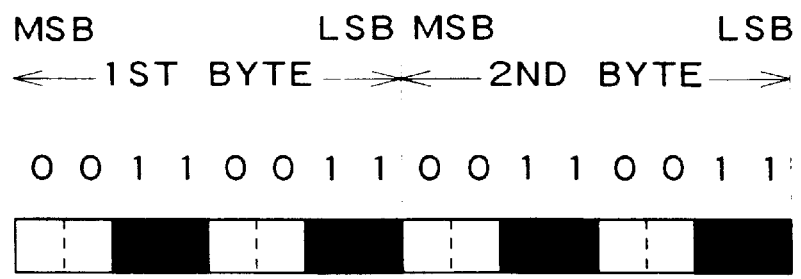
FIG. 17 is a rough drawing for the purpose of describing drawing data according to an embodiment of this invention.
FIG. 18 is a rough drawing for the purpose of describing drawing data according to an embodiment of this invention.

(2) Drawing Command Group a. Graphic drawing point displacement
(Argument)
  Latitude: 4 byte integer with code
  Longitude: 4 byte integer with code
(Function)
  Specifies the start point of the next drawing command (pointer, location mark, straight line, circle, polygon). For a circle, it specifies the center position.

b. Pointer
(Argument) None
(Function)
  Draws a pointer mark to indicate a place in which the user is presently interested. When the image to be drawn at the point display position is not specified, it is a black circle (●) of 16 dots×16 dots. Only one pointer can be displayed at one time by the map display application. When a pointer drawing command is issued, the map display application cancels the mark which was drawn by the immediately preceding command.

c. Location mark
(Argument)
  Property no.: Property no. without code
  This is a property no. specified by 0–31.
(Function)
  Draws a mark showing buildings or facilities on a map.
  For example, to show the location of a shop, the latitude/longitude may be given to indicate the center of the premises or the center of the part facing the road in front of the shop. When the image drawn in the mark display position is not specified, it is a black circle (●) of 16 dots×16 dots.

d. Straight line
(Argument)
  Property no.: Property no. without code
  This is a property no. specified by 0–31.
  Latitude: 4 byte integer with code
  Longitude: 4 byte integer with code
  Displays the position of the end of the straight line to be drawn.
(Function)
  Draws a straight line from a location in which a graphic drawing point is to be moved, or an end point of a linear part of a drawing, to a specified latitude/longitude position.

e. Circle
(Argument)
  Line drawing property no.: Property no. without code
  This is a line drawing property no. specified by 0–31.
  Shading property no.: Property no. without code
  This is a shading property no. specified by 0–31.
  Radius: 1 byte integer without code
  Expresses the size of a circle in the longitude direction on the screen as a number of dots.
(Function)
  Draws a circle of the given radius around a location to which a graphic drawing point is to be moved.

f. Polygon
(Argument)
  Line drawing property no.: Property no. without code
  This is a line drawing property no. specified by 0–31.
  Shading property no.: Property no. without code
  This is a shading property no. specified by 0–31.
  No. of points: 1 byte integer without code
  Expresses the no. of points comprising the polygon.
  The origin and end point are treated as separate points.
  Point coordinate data:
  Latitude: 4 byte integer with code
  Longitude: 4 byte integer with code
  The latitude/longitude pair continues for the number of points.
  The coordinates of the points of the polygon are expressed by latitude/longitude.
(Function)
  Draws a polygon linking each point. The start point and end point specified by the argument are treated as separate points, and the start point and end point are linked without closing the polygon when the drawing is made.
  Character displays in map data may be superposed on the polygon by the map display application, and the characters may be made unerasable by shading in the polygon.

g. Character string
(Argument)
  Property no.: Property no. without code
  This is a property no. specified by 0–31.
  Length of character strings: 1 byte integer without code
  This is the no. of bytes in the character string.
  Character data: 1 byte or 2 byte character x character string length.
(Function)
  Displays the character string. As shown in FIG. 13, the coordinate Ps specified by displacement of the graphic drawing point is situated at the lower left corner.
h. Drawing content erasure
(Argument) None
(Function)
  All supplementary data drawn on the map so far is erased except for the pointer display.
  The drawing contents of the supplementary data are stored internally, and even when scroll is performed or the magnification is changed, the supplementary data is again drawn in the corresponding position on the map. When a command is received to erase the drawing contents, the supplementary data contents are erased from the display, and the drawing data for re-drawing stored internally is also erased. This prevents losing the map when various supplementary data is displayed in succession.
i. Pointer erasure
(Argument) None
(Function)
  Erases the pointer display. The drawing contents apart from the pointer do not change.
(3) Property Specifying Group
a. Display properties of pointer drawing
(Argument)
  Display color/foreground: RGB. Each is a 1 byte integer without code
  Display color/background: RGB. Each is a 1 byte integer without code
  Specifies the color of the pointer display as levels of red, green and blue.
  Blink interval: 1 byte without code (specified in units of 1/10 second)
  Specifies the blink interval of the pointer display.
  When the blink interval is not an integer/size 0, a point mark is displayed or erased. When it is erased, the display is returned to the state before drawing the point.
  Alternate color flag: Integer/size 1 byte without code
  The following alternate colors are valid when the flag is "1".
  They are invalid when the flag is "0". Alternate colors/foreground: Red (R), Green (G) and Blue (B). Each is a 1 byte integer without code.
  Alternate,colors/background: R, G, B. Each is a 1 byte integer without code.
  Symbol bit data: 16 bytes
  Expresses 16×16 dot symbols. The data sequence is as shown in FIG. 14.
  A "1" bit draws dots in the foreground, and a "0" bit draws dots in the background.
  Only dots for which the following mask bit pattern is "1" are drawn (FIG. 16).
  Mask bit pattern: 16 bytes
  Expresses 16×16 dot patterns. The data sequence is as shown in FIG. 14.
  Only positions denoted by "1" bits are drawn according to the aforesaid symbol bit pattern (FIG. 16).
  Nothing is drawn in "0" bit positions, and they therefore appear to be transparent as shown in FIG. 16C.
  Hot point command: 1 byte integer without code
  Positions denoted for the purpose of explanation indicate the locations of symbols.
  The correspondence between values of the point indication (0 8) and positions on symbols is shown in FIG. 15.
(Function)
  The color of the point display can be varied between "display color" and "alternate colors".
  When the time indicated by "blink interval" elapses starting from when display begins in either the "display color" or "alternate color", there is a change-over to the other color, and this operation is successively repeated.
  However display color and alternate colors are used when a plurality of points are displayed, and only for the point which is finally drawn.
b. Location mark symbol specification
(Argument)
  Property no.: Property no. without code
  This is a property no. specified by 0–31
  Symbol bit pattern: 16 bytes
  Expresses 16×16 dot symbols. The data sequence is as shown in FIG. 14.
  A "1" bit draws a dot in the foreground, and a "0" bit draws a dot in the background. Only pels for which the mask bit pattern is "1" are drawn (FIG. 16).
  Mask bit pattern: 16 bytes
  Expresses 16×16 dot patterns. The data sequence is as shown in FIG. 14.
  Only positions denoted by "1" bits are drawn according to the symbol bit pattern (FIG. 16).
  Nothing is drawn in "0" bit positions, and they therefore appear to be transparent as shown in FIG. 16C.
  Point indication: 1 byte integer without code
  Selects the part of a symbol indicated by the latitude and longitude position denoted by the location mark.
  The correspondence between the value of the point indication and the position on the symbol is shown in FIG. 15.
c. Line display property
(Argument)
  Property no.: Property no. without code
  Property no. specified by 0–31.
  Line width: 1 byte without code
  Expresses number of dots.
  Colors: Red (R), Green (G), Blue (B). Each is a 1 byte integer without code. Specifies colors as levels of red, green and blue.
  Line pattern: 2 bytes without code
  Only positions denoted by "1" bits are drawn. Nothing is drawn in positions corresponding to "0" bits, and they therefore appear to be transparent.
  The bit sequence and pattern for dotted lines are shown in FIG. 17.
(Function)
  Specifies the width, color and pattern of straight lines, circles or polygons. Draws a solid line when the drawing is not specified.
d. Shading property
  Property no. specified by 0–31.
  Pattern: 1 byte integer×8 rows without code
  Bit sequences and patterns for parallel slanting lines are shown in FIG. 18.
  Display color/foreground: R, G, B, each 1 byte integers without code
  Display color/background: R, G, B, each 1 byte integers without code
  Specifies colors as levels of red, green and blue.
(Function)

Specifies property when circles and polygons are shaded.

Display color/foreground specifies the color of positions corresponding to "1" bits in the shaded pattern.

Display color/background specifies the color of positions corresponding to "0" bits in the shaded pattern.

e. Character string display properties (Argument)

This is a property no. specified by 0–31.

Font size: 1 byte integer without code

The height of a rectangle containing the character is expressed as a no. of dots.

The map display application selects and displays the font size closest to this specification.

Display direction: 1 byte integer without code

Specifies the alignment direction of the character string.

0: right direction (left to right)

1: left direction (right to left)

2: vertical direction (top to bottom)

Display color/foreground: R, G, B, each 1 byte integers without code

Specifies colors of characters as levels of red, green, blue.

Display color/background: R, G, B, each 1 byte integers without code

Specifies colors of character backgrounds as levels of red, green and blue.

4. Point Specifying Group a. Point specification (Argument)

Latitude: 4 byte integer with code

Longitude: 4 byte integer with code (Function)

Issued when a map is specified in the map drawing application using a pointing device.

C. Limitations of Drawing (1) Upper/Lower Relation on Display

When a plurality of display elements are superposed, the elements drawn by the latest command will be on top, and elements already drawn will be hidden. For example when a shaded polygon is superposed on a character display, the characters will no longer be visible, so the sender of additional drawing information must control which of the two appears on top. However pointers are always on top and are never hidden by other drawing elements.

(2) Storage of Display Contents

The map display application must store received drawing group commands so that additional drawing information can be redrawn when the user performs scrolling or zoom-in.

There is however generally no need to store drawing group commands before receiving drawing content erasure commands.

(3) Types of Display Properties

To facilitate creation of applications, up to 32 types of display properties may be used on one occasion.

Next, the registration of additional information in the map information system according to this invention will be described with reference to FIG. 19 and FIG. 20.

Figure 19:
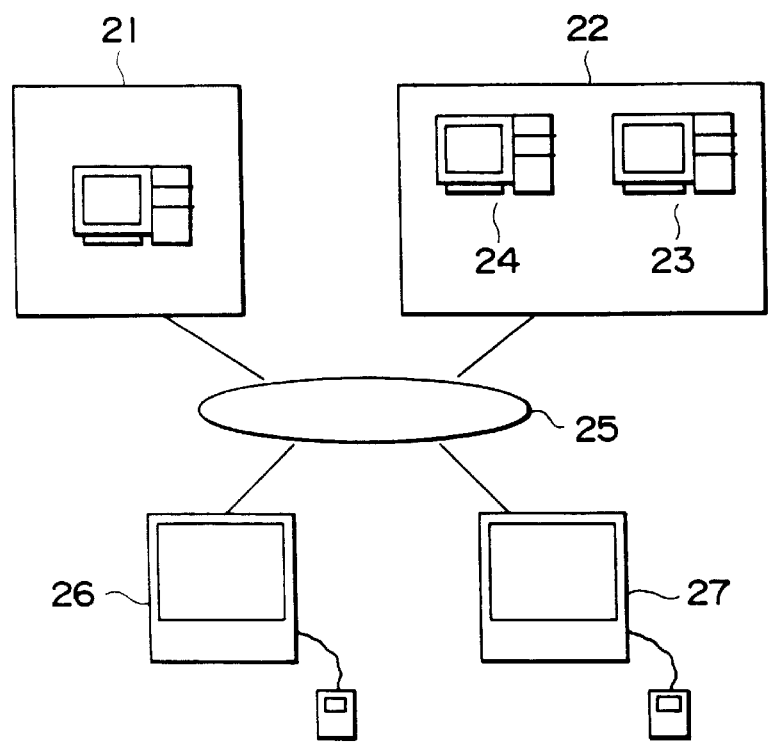
FIG. 19 is a block diagram of this invention.
Figure 20:
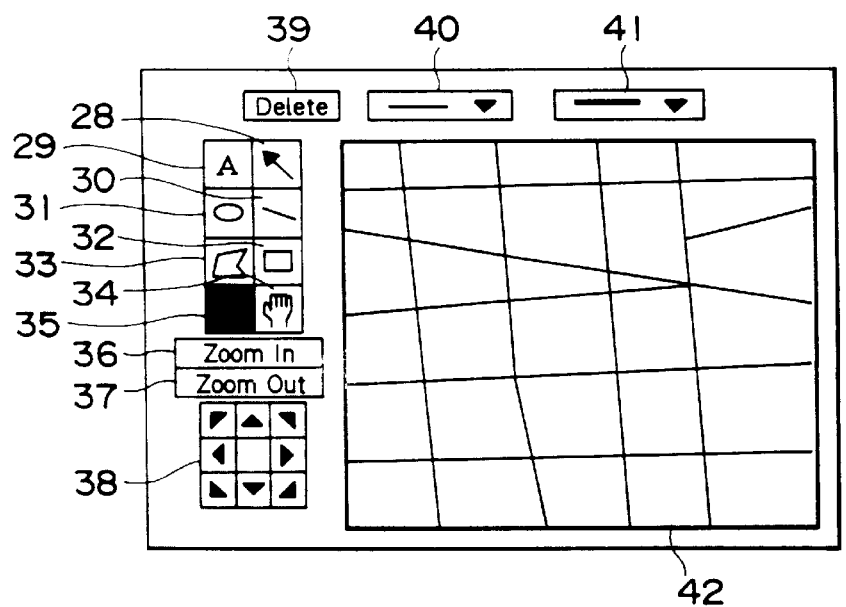
FIGS. 20–27 are diagrams for the purpose of describing information registration and editing according to this invention.

First, describing the general registration procedure, the home page designer accesses a map information data base 23 via the INTERNET 25 as shown in FIG. 19, and acquires an additional drawing/editing application for registration. This uses applets which distribute applications via networks that are already commercialized such as JAVA and Active X. Alternatively, the home page designer may start an application already in the home page designer's terminal. Next, as shown in FIG. 20, the display position is moved using a map shift button 38, and a desired map is displayed by operating an enlargement button 36 or reduction button 37.

Additional elements are drawn on this map using the additional drawing tools 28 to 35 and 39 to 41. After editing of the additional drawing elements is complete, the elements are registered in the additional information data base.

The details of the method of editing this additional information will be described with reference to FIGS. 21A–21H. FIGS. 21A–21H describe the registration application operating screen. First, in FIG. 21A, an area specifying tool 28 is selected. The selection of tools is made by clicking a button corresponding to the tool with the mouse. When the tools 28 to 35 are selected, the selection is shown by a change in the display such as the background color. When a cursor 43 is brought over an additional drawing element which has already been written on the map, in this case the character string "ABC Shop", and the mouse button is clicked, the character string is selected. Four small squares are displayed at the four corners of the character string to show the selection. When the mouse is moved while the mouse button is depressed, the character string is dragged with the cursor 43, and when the mouse button is released, the character string is moved to the new position. When an erase button 39 is pressed, the character string is erased.

Figure 21A:
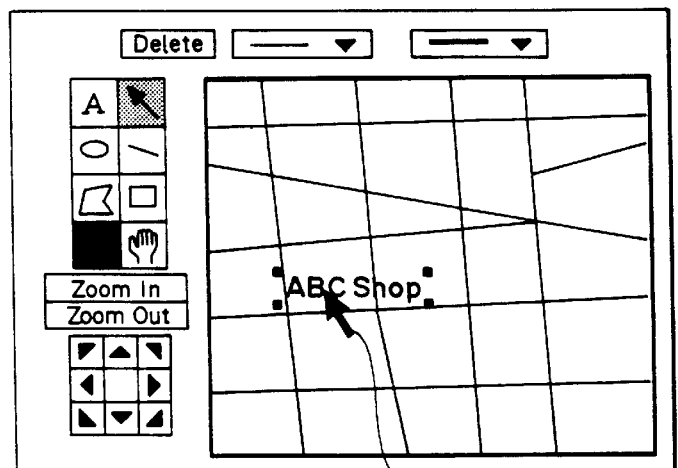
Figure 21B:
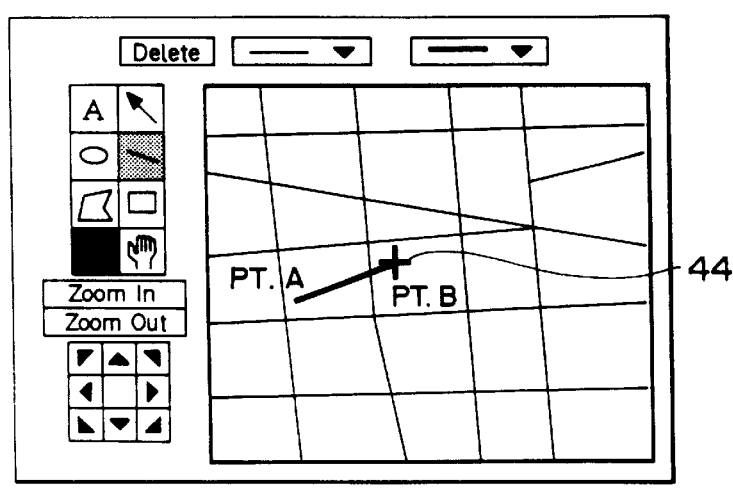

In FIG. 21B, the line tool 30 is described. When the line tool is selected, a cursor 44 becomes a cross as shown in the diagram. When the mouse button is pressed at a point A and moved to a point B while it is still depressed, a line is drawn from the point A to the point B as shown in the figure. When the mouse button is released, this line is registered as one dimensional information.

Figure 21C:
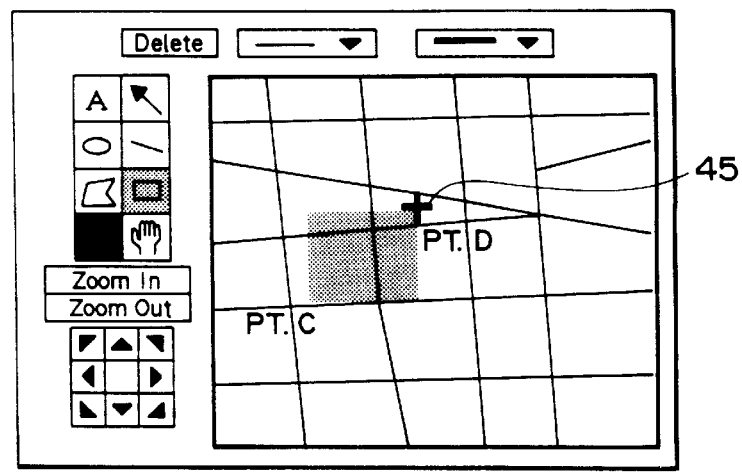

In FIG. 21C, the square tool 32 is described. When the square tool is selected, a cursor 45 becomes a cross as shown in the diagram. When the mouse button is pressed at a point C and moved to a point D while it is still depressed, a square is drawn having a diagonal between the points C and D as shown in the figure. When the mouse button is released, this line is registered as two dimensional information.

Figure 21D:
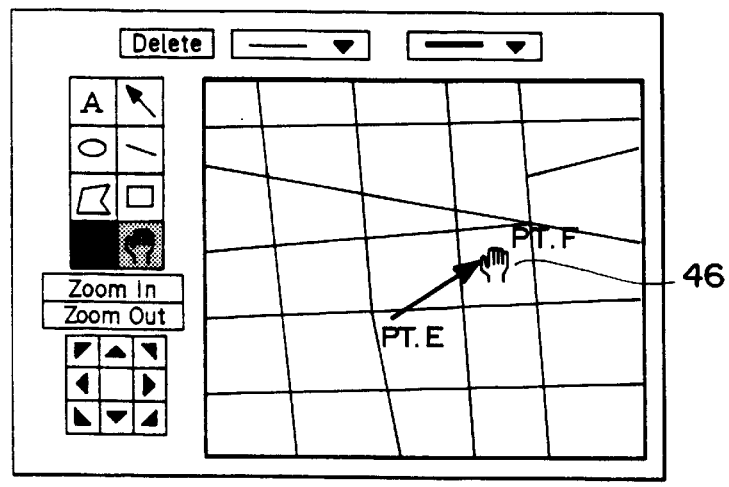

In FIG. 21D, the shift tool 34 is described. When the shift tool is selected, a cursor 46 assumes the shape of a hand. When the mouse button is pressed at a point E and moved to a point F while it is still depressed, the map display is scrolled by an amount corresponding to a vector EP.

Figure 21E:
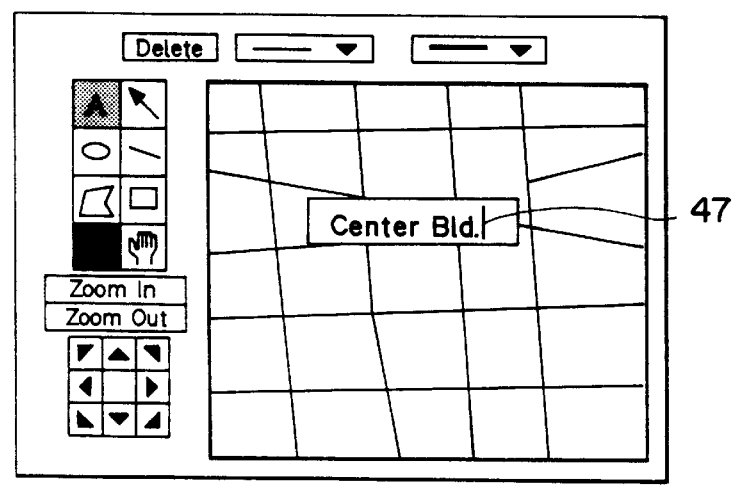

In FIG. 21E, the character input tool 29 is described. When the character input tool is selected, a cursor 47 becomes the shape of a letter I. When characters are then input from the keyboard, the input characters are drawn on the map.

Figure 21F:
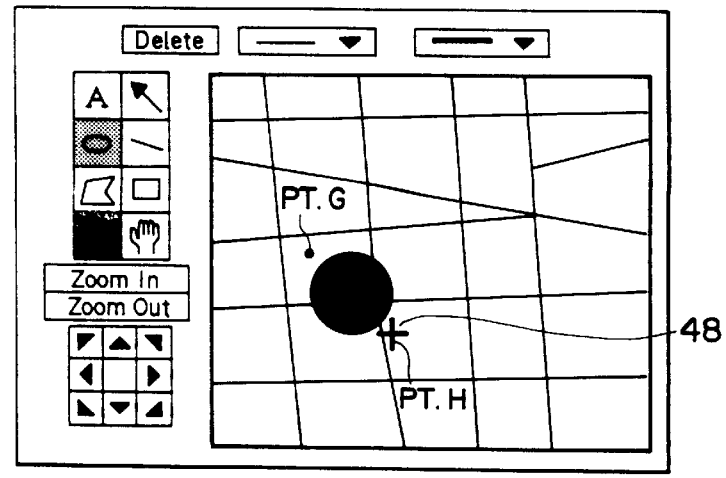

In FIG. 21F, a circle tool 31 is described. When the circle tool is selected, a cursor 48 becomes a cross. When the mouse button is pressed at a point G and moved to a point H while it is still depressed, a circle is drawn inside a square having a diagonal from the point G to the point H, as shown in the figure. When the mouse button is released, this circle is registered.

Figure 21G:
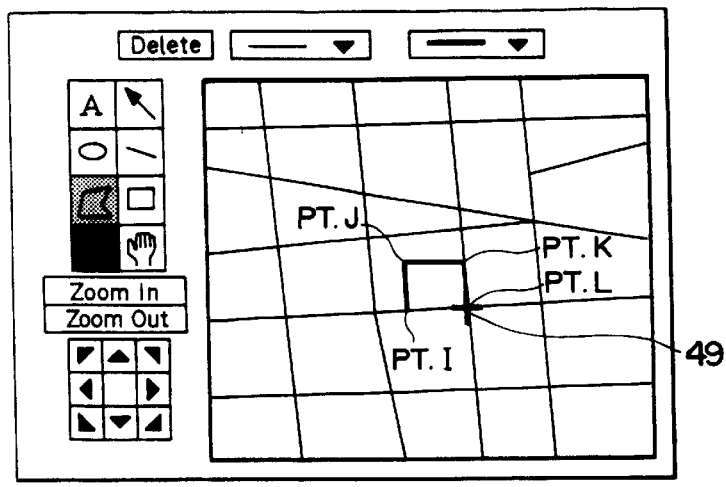
Figure 21H:
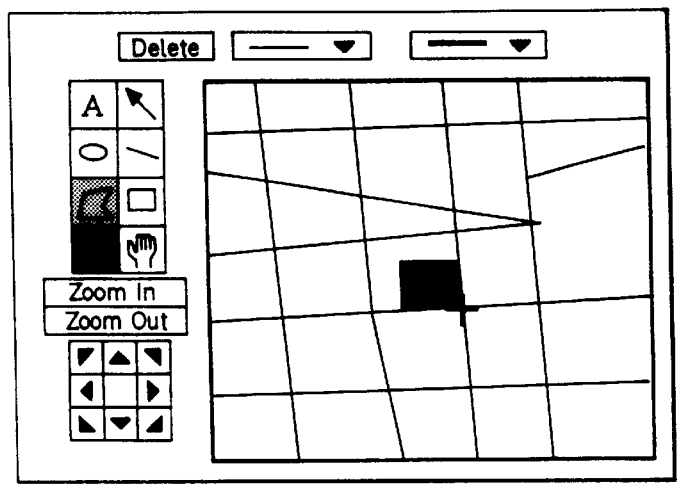

In FIGS. 21G and 21H, a polygon tool 33 is described. When the polygon tool is selected, a cursor 49 becomes a cross. When the mouse button is pressed at a point I, released, then pressed at a point J, released, and the same procedure is repeated at points K,L, lines IJ, JK and KL are drawn as shown in FIG. 21G. When the mouse button is quickly pressed twice, a polygon is drawn having apices I,J,K,L as shown in FIG. 21H, and this polygon is registered.

Figure 22:
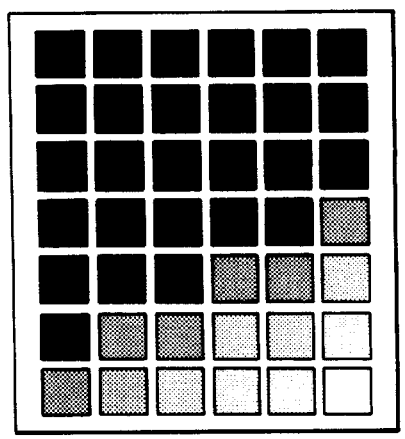

In FIG. 22, a color specifying method is described. When a color specifying button 35 is pressed, a window as shown in FIG. 22 is displayed. Small color specifying squares are arranged in rows in the window, and when the mouse is clicked on one of the squares, the color of that square is selected and the window closes. Characters, lines, circles, polygons and squares which are specified subsequently are drawn in the specified color.

Figure 23A:
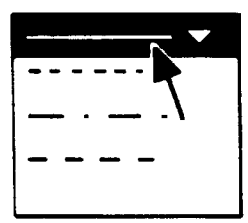
Figure 23B:
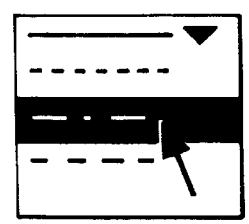

In FIG. 23A and FIG. 23B, a method of selecting line types is described. When the cursor is brought over the broken line selection button 40, and the mouse button is pressed, a pop-up menu is displayed as shown in FIG. 23A, and the line corresponding to the broken line type selected, is displayed with black and white reversed. In this example, the uppermost solid line is selected.

Next, the cursor is brought over a line type different from the type which was first inverted with the mouse button still depressed. Only the line beneath the cursor is then displayed with black and white reversed, as shown in FIG. 23B. When the mouse button is released, the line type with which the cursor was aligned is selected, and all lines drawn subsequently are drawn with this line type.

Figure 24A:
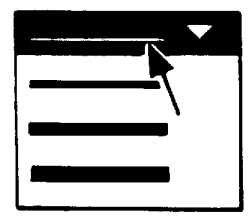
Figure 24B:
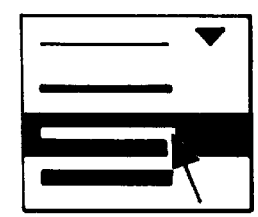

In FIGS. 24A and 24B, a method of selecting line thickness is described. When the cursor is brought over a line thickness selecting button 41, a pop-up menu is displayed as shown in FIG. 24A, and the line type corresponding to the selected line thickness is displayed with black and white reversed. This line thickness is then selected by the same procedure as in the pop-up menus of FIGS. 23A and 23B.

Figure 25:
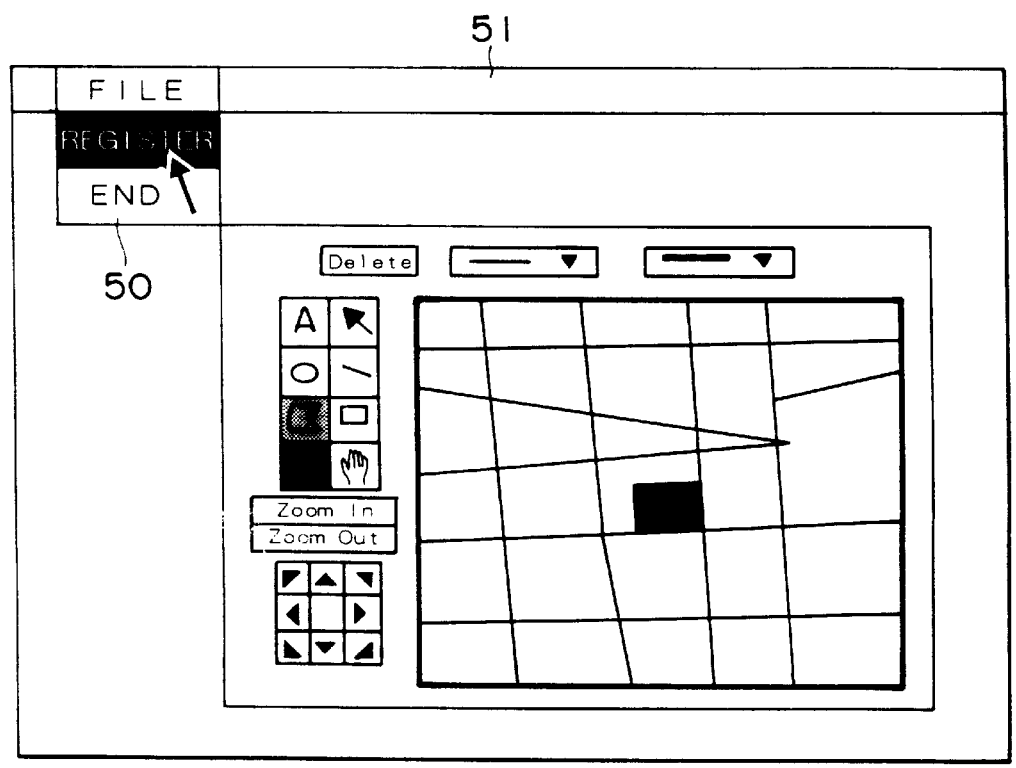

When all the elements have been drawn, they are then registered in the additional information center. The registration procedure is performed for example using a pull-down menu 50 from a menu bar 51, as shown in FIG. 25. When registration is selected from the pulldown menu, the following details are registered in the additional information data base 24 from the home page designer terminal 26 shown in FIG. 19.

Figure 26:
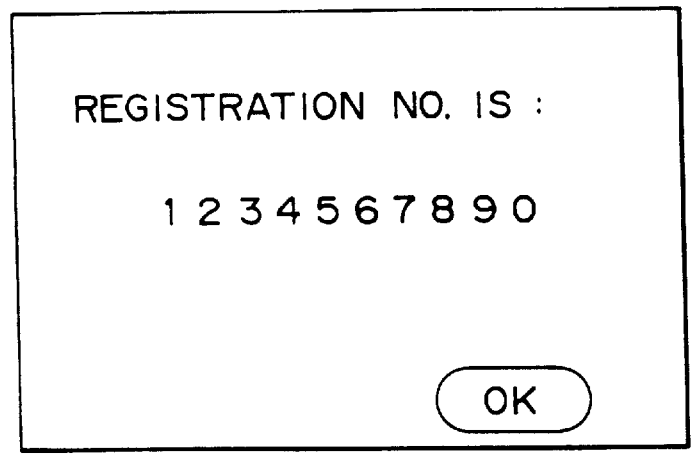

Map center latitude and longitude
Map scale
Map height and width
Edited additional drawing elements When registration in the additional information data base is complete, a window as shown in FIG. 26 is displayed, and a registration number for the information is automatically assigned by the additional information data base and is displayed.

When the home page designer presses a button linking to a map, this number is used to call the map information data base center. An example in HTML (HyperText Markup Language) is shown below.

<A href="http://www.mapserver.com/cgi-bin/displaymap?1234567890"><IMG src="button.gif"></A>

Figure 27:
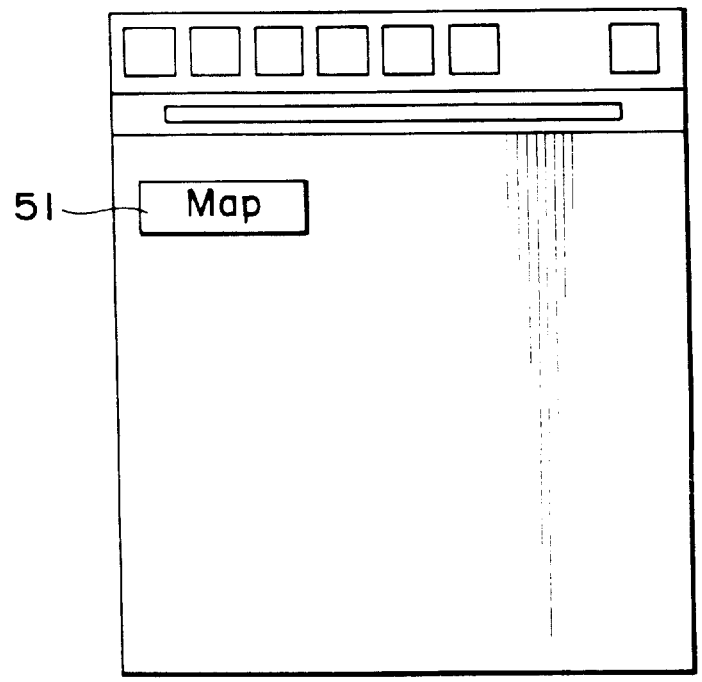

When this example is displayed on a home page, it appears as shown in FIG. 27.

Figure 28:
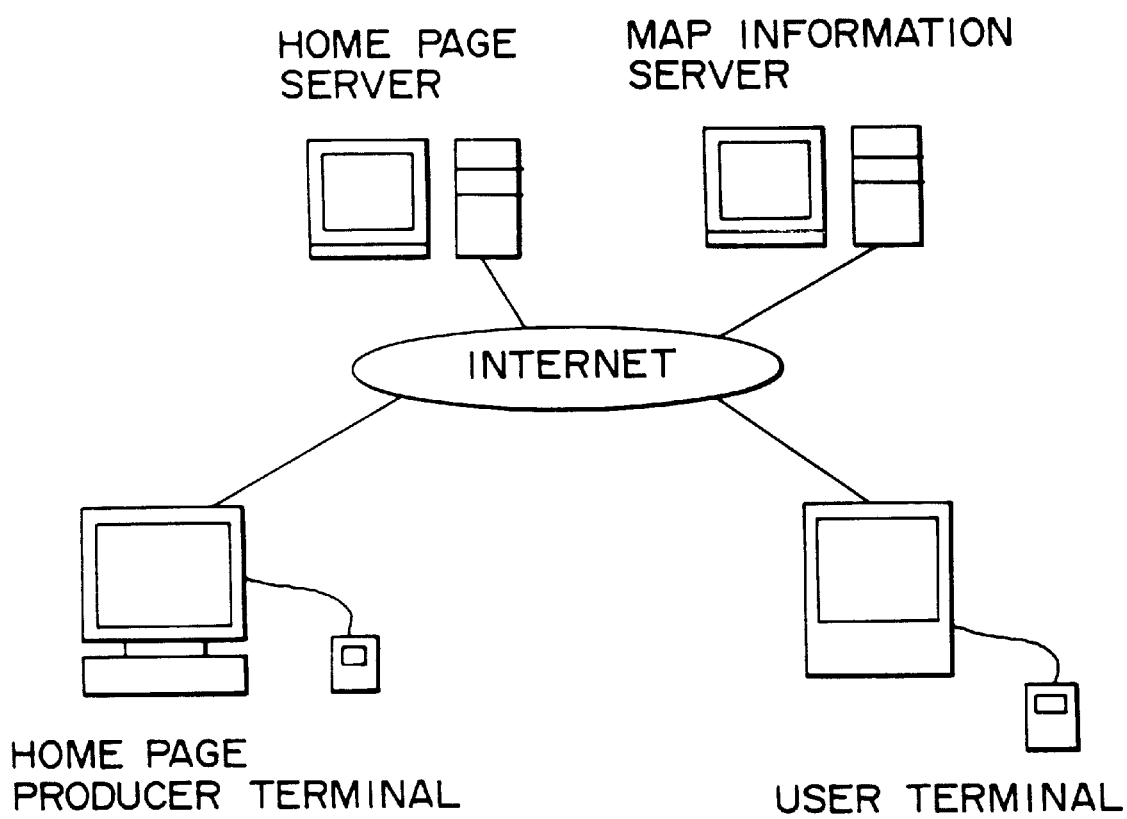
FIG. 28 is a block diagram of this invention.

The above is a description using the additional information data base. FIG. 28 shows an example where the additional information data base is not used. In this case, the details superposed on the map are stored by the home page server, and are written in a text file using the HTML which describes the home page. A function is therefore provided to display the editing results as a character string instead of the registration function in the additional drawing editing application.

Figure 29:
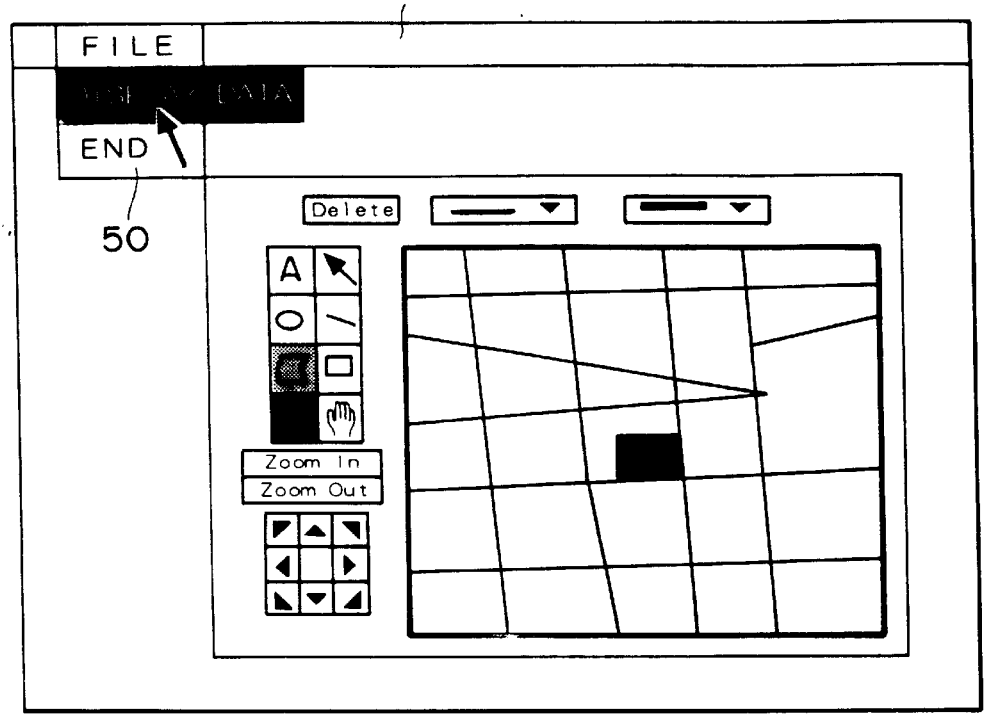
FIGS. 29 and 30 are diagrams for the purpose of describing information registration and editing according to this invention.

This will be described with reference to FIG. 29 and FIG. 30. The pull-down menu 50 is displayed from the menu bar 51, and display data is selected. This causes a window 53 shown in FIG. 30 to be displayed, and the editing results are displayed as a character string in a text display 52.

To represent the editing results as a character string, they are joined to a statement having a unique function. An example of the statement format will be described.

(1) map: scale level, latitude, longitude, width, height
Specifies the map display method.

Scale level: shows the map scale level, e.g. 0 is the widest level and 10 is the most detailed Latitude, longitude: shows the latitude and longitude of map center (0.1 degree units)

Width, height: shows width and height of map image in pixel units (2) color: R,G,B Colors are specified in terms of red, green and blue components. All drawing specification statements written subsequently are drawn in the colors specified here.

R: red (0 to 255)
G: green (0 to 255)
B: blue (0 to 255)

(3) line type:n

Specifies the line type. Line types in line drawing statements written after this statement, follow the specified line type. n: 0=solid line, 1=fine dotted line, 2=dot-dash line, 3=rough dotted line (4) width:n Specifies the line width. Line widths of line drawing statements written after this statement, and line widths of outlines drawn by rectangle, ellipse and polygon drawing statements, follow the line width specified here.

n: shows line width in number of pixels (5) line: x1,y1,x2,y2

Specifies a line drawing.

x1: Latitude of line start point (0.1 degree units)
y1: Longitude of line start point (0.1 degree units)
x2: Latitude of line end point (0.1 degree units)
y2: Longitude of line end point (0.1 degree units)

(5) oval: x1,y1,x2,y2

Specifies an ellipse drawing. Draws an ellipse touching the sides of a rectangle of which one diagonal is a line connecting a position coordinate 1 represented by (x1,y1) and a position coordinate 2 represented by (x2,y2).

x1: Latitude of position coordinate 1 (0.1 degree units)
y1: Longitude of position coordinate 1 (0.1 degree units)
x2: Latitude of position coordinate 2 (0.1 degree units)
y2: Longitude of position coordinate 2 (0.1 degree units)

(6) rect: x1,y1,x2,y2

Specifies a rectangle drawing. Draws a rectangle of which one diagonal is a line connecting a position coordinate 1 represented by (x1,y1) and a position coordinate 2 represented by (x2,y2).

x1: Latitude of position coordinate 1 (0.1 degree units)
y1: Longitude of position coordinate 1 (0.1 degree units)
x2: Latitude of position coordinate 2 (0.1 degree units)
y2: Longitude of position coordinate 2 (0.1 degree units)

(7) poly: x1,y1,dx2,dy2,dx3,dy3 . . .

Specifies a polygon drawing. A position coordinate represented by (x1,y1) is the start point, and the following dx2,dy2,dx3,dy3 . . . form pairs which represent the coordinates of the apices of the polygon. It should be noted that these pairs do not correspond to latitude and longitude, but to differences from the coordinates represented by the immediately preceding pair. For example, dx2,dy2 represents the preceding start point, and the difference in latitude and longitude from the following apices of the polygon. Expressed as an equation, when the coordinates of the polygon apices (latitude, longitude) are (x1,y1),(x2,y2),(x3,y3) . . .
$dx2=x2-x1$
$dy2=y2-y1$
$dx3=x3-x2$
$dy3=y3-y2$ Here, all coordinate values are expressed in 0.1 degree units.

Figure 30:
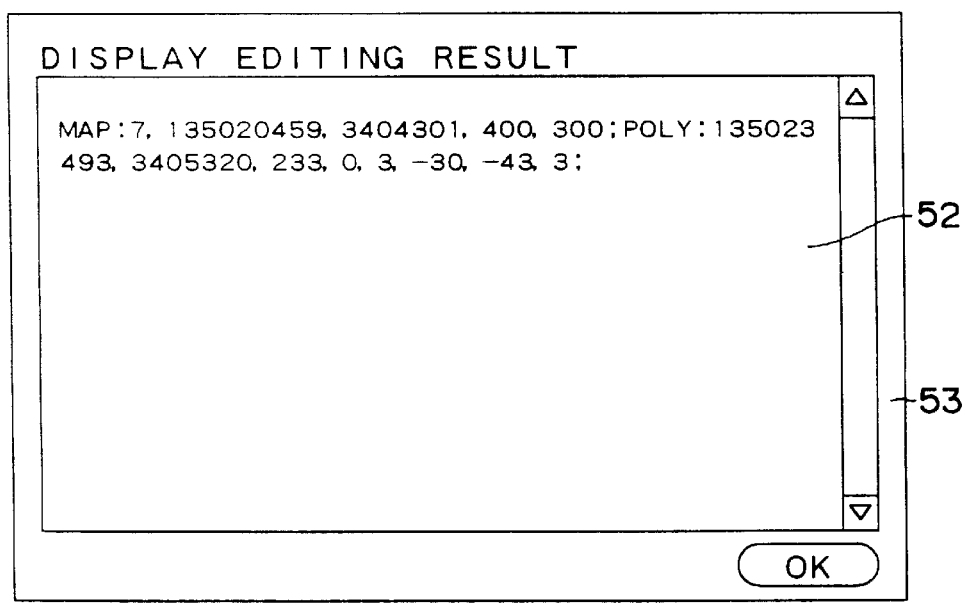

For example, writing a map link in the HTML format using the editing results shown in FIG. 30:

```
<FORM METHOD="POST"
ACTION="http://www.mapserver.or.jp/cgi-bin/showmap">
<INPUT TYPE=HIDDEN" NAME="DISP_PARAM"
VALUE="map:7,135020459,3404301,400,
    300;poly:135023493,34 05320,233,0,3-30,-43,3;">
<INPUT type="IMAGE" name="map" src="button.gif">
</FORM>
```

The information displayed by the web browser according to this statement is the same as that of FIG. 27. When the button shown in FIG. 30 is pressed, information to the effect that the parameter having the name "DISP_PARAM" is the character string:

"map:7,135020459,3404301,400,300;poly:135023493, 3405320, 233,0,3-30,-43,3;" is sent to the map information data base using the format "FORM". In accordance with the value of the parameter received, a map is drawn with additional information superposed, and map image data is sent to the user's web browser.

What is claimed is:

1. A data structure system for providing map data and data related to said map data at a user terminal, comprising:

map data means for regularly updating and storing said map data corresponding to position data, for sending a map data search page to said user terminal, for retrieving said regularly updated map data according to multiple searching parameters simultaneously entered by a user using said map data search page, said multiple searching parameters including information in addition to a location name, and for displaying at said user terminal only said regularly updated map data retrieved according to said searching parameters when said user directly accesses said regularly updated map data;

position data means for storing said position data and first map-related data in accordance with one of said position data and said map data, for sending a position data and first map-related data search page to said user terminal, for retrieving said position data and said first map-related data according to said multiple searching parameters entered by said user using said position data and first map-related data search page, and for displaying at said user terminal only said position data and said first map-related data retrieved according to said multiple searching parameters when said user directly accesses said position data and said first map-related data;

guide data means for storing second map-related data, for sending a guide data search page to said user terminal, for retrieving said second map-related data according to said searching parameters entered by said user using said guide data search page, and for displaying at said user terminal only said second map-related data retrieved according to said multiple searching parameters when said user directly accesses said second map-related data, wherein said guide data means selectively displays map data corresponding to said second map-related data and said second map-related data only when said user presses a map button displayed with said second map-related data at said user terminal; and network means for transferring to said map data means, to said position data means, and to said guide data means said searching parameters entered using said map data search page, said searching parameters entered on said position data and first map-related data search page and said searching parameters entered on said guide data search page, respectively, and for transferring from said map data means said regularly updated map data, from said position data means said position data and first map-related data, and from said guide data means said second map-related data and said map data, wherein said map data means, said position data means, and said guide data means are linked together.

2. The data structure system for providing map data and data related to said map data as set forth in claim 1, wherein said position data includes longitude and latitude data.

3. The data structure system for providing map data and data related to said map data as set forth in claim 1, wherein said map data means, said position data means and said guide data means are registered and/or edited through said network means.

4. The data structure system for providing map data and data related to said map data as set forth in claim 1, wherein said network means supports a world wide web service, and said searching parameters include business hours and business description information.

5. The data structure system for providing map data and data related to said map data as set forth in claim 1, wherein said map data means, said position data means and/or said guide data means includes at least 0-th dimension information pertaining to a predetermined target object.

6. A method for providing map data and data related to said map data at a user terminal, said method comprising the steps of:

regularly updating said map data;

receiving at least one of a map data search page, a position data and first map-related data search page and a guide data search page through a network;

retrieving only said regularly updated map data from a database which includes said regularly updated map data corresponding to position data according to multiple searching parameters simultaneously entered by a user using said map data search page, said searching parameters including information in addition to a location name, retrieving only said position data and first map-related data from a database including said position data and said first map-related data according to said multiple searching parameters entered by said user using said position data and first map-related data search page, and retrieving only second map-related data from a database including said second map-related data according to said multiple searching parameters entered by said user using said guide data search page;

displaying map data corresponding to said second map-related data and said second map-related data only when said user presses a map button displayed with said second map-related data at said user terminal; and transferring said regularly updated map data, said position data, said first map-related data, and/or said second map-related data through said network.

7. The method for providing map data and data related to said map data as set forth in claim 6, further comprising the step of confirming a correspondence of an identification transferred through said network with a predetermined identification stored in a database before generating said map data, said position data, said first map-related data, and said second map-related data.

8. The method for providing map data and data related to said map data as set forth in claim 6, wherein said network is constructed by accessing a world wide web service, and said searching parameters include business hours and business description information.

9. A map data and map-related data receiving apparatus, comprising:

transmitting means for transmitting a search command entered by a user to a map data system including regularly updated map data corresponding to position data, to a position data system including said position data and first map-related data in accordance with one of said position data and said regularly updated map data, and/or to a guide data system including second map-related data through a network, wherein said search command includes multiple searching parameters including information in addition to a location name for simultaneous entry by a user;

receiving means for receiving said regularly updated map data retrieved by said map data system, for receiving said position data and said first map-related data retrieved by said position data system, and/or for receiving said second map-related data retrieved by said guide data system through said network retrieved according the said multiple search parameters; and display means for displaying only said regularly updated map data, said position data, said first map-related data, and said second map-related data received by said receiving means retrieved according to said multiple search parameters, wherein map data corresponding to said second map-related data and said second map-related data are displayed only when said user presses a map button displayed with said second map-related data at a user terminal.

* * * * *